US012272332B2

(12) United States Patent
Jeon et al.

(10) Patent No.: US 12,272,332 B2
(45) Date of Patent: Apr. 8, 2025

(54) ELECTRONIC DEVICE AND METHOD FOR OPERATING HIGH SPEED SCREEN OF ELECTRONIC DEVICE

(71) Applicant: SAMSUNG ELECTRONICS CO., LTD., Suwon-si (KR)

(72) Inventors: Gyehun Jeon, Suwon-si (KR); Sungyul Choe, Suwon-si (KR); Seonghoon Choi, Suwon-si (KR); Nawoong Han, Suwon-si (KR); Sangheon Kim, Suwon-si (KR); Yeunwook Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/214,560

(22) Filed: Jun. 27, 2023

(65) Prior Publication Data

US 2023/0343305 A1 Oct. 26, 2023

Related U.S. Application Data

(63) Continuation of application No. 17/167,483, filed on Feb. 4, 2021, now abandoned.

(30) Foreign Application Priority Data

Feb. 10, 2020 (KR) ........................ 10-2020-0015968

(51) Int. Cl.
*G09G 5/00* (2006.01)
*G09G 5/14* (2006.01)

(52) U.S. Cl.
CPC ............... *G09G 5/003* (2013.01); *G09G 5/14* (2013.01); *G09G 2320/041* (2013.01)

(58) Field of Classification Search
CPC . H04N 7/01; H04N 11/20; G09G 3/20; G09G 3/30; G09G 3/32; G09G 3/34;
(Continued)

(56) References Cited

U.S. PATENT DOCUMENTS 5,899,575 A 5/1999 Okayama et al.
6,118,487 A 9/2000 Hirtz et al.
(Continued)

FOREIGN PATENT DOCUMENTS

JP H10-051810 2/1998
JP H11-239802 9/1999
(Continued)

OTHER PUBLICATIONS

U.S. Appl. No. 17/167,483, filed Feb. 4, 2021; Jeon et al.
(Continued)

*Primary Examiner* — Chanh D Nguyen
*Assistant Examiner* — Nguyen H Truong
(74) *Attorney, Agent, or Firm* — NIXON & VANDERHYE P.C.

(57) ABSTRACT

An electronic device may include: a display configured to display an execution screen of an application, and a processor operatively connected to the display. The processor is configured to: execute the application; receive a frequency event from the application; identify predetermined settings based on the application being executed; determine, based on the frequency event and the predetermined settings, a refresh rate of an execution screen of the application; identify, based on state information of the electronic device and the determined refresh rate, information for controlling operation of a high speed screen; and controlling, based on the identified information, the high speed screen related to the execution screen of the application on the display.

14 Claims, 25 Drawing Sheets

(58) Field of Classification Search
CPC .. G09G 3/36; G09G 3/3225; G09G 2320/041; G09G 5/003; G09G 5/00; G09G 5/12; G09G 5/14; G09G 5/18; G09G 5/02; G09G 5/36; G09G 5/391; G09G 5/393; G09G 5/395; G06K 9/36; G06F 1/20; G06F 1/32; G06F 3/14; G06F 3/038; G06F 3/0481; G06F 3/0484; H04L 12/58; H04L 29/06; H04L 29/08; G06T 1/20; G06T 1/60
See application file for complete search history.

(56) References Cited

U.S. PATENT DOCUMENTS

| | | | | |
|---|---|---|---|---|
| 6,463,652 | B1 | 10/2002 | Narushima et al. | |
| 9,336,754 | B2 | 5/2016 | Li | |
| 2005/0162549 | A1 | 7/2005 | Carlsgaard et al. | |
| 2007/0279407 | A1 | 12/2007 | Vasquez | |
| 2008/0049006 | A1* | 2/2008 | Yi | G09G 3/3406 345/211 |
| 2013/0159874 | A1* | 6/2013 | Bhogal | G06F 3/1454 715/733 |
| 2013/0235048 | A1* | 9/2013 | Gorla | G09G 5/393 345/501 |
| 2014/0082518 | A1 | 3/2014 | Bhogal et al. | |
| 2016/0180762 | A1* | 6/2016 | Bathiche | G06F 3/038 345/174 |
| 2016/0187949 | A1 | 6/2016 | Sen | |
| 2017/0047019 | A1* | 2/2017 | Li | G09G 3/2092 |
| 2017/0262040 | A1 | 9/2017 | Lee et al. | |
| 2018/0033378 | A1 | 2/2018 | Li et al. | |
| 2018/0239499 | A1 | 8/2018 | Santoro et al. | |
| 2018/0261190 | A1 | 9/2018 | Yi et al. | |
| 2019/0156785 | A1* | 5/2019 | Marchya | G09G 3/2096 |
| 2019/0180705 | A1* | 6/2019 | Choudha | G06F 3/0485 |
| 2019/0355331 | A1 | 11/2019 | Wood | |
| 2022/0116520 | A1* | 4/2022 | Hsieh | G09G 3/2096 |
| 2022/0270533 | A1 | 8/2022 | Ranjan | |

FOREIGN PATENT DOCUMENTS

| | | |
|---|---|---|
| JP | 2004-032814 | 1/2004 |
| JP | 6484329 | 3/2010 |
| JP | 2013-205600 | 10/2013 |

OTHER PUBLICATIONS

International Search Report issued May 10, 2021 in corresponding International Application No. PCT/KR2021/001385.

Korean Office Action dated Jul. 4, 2024 for KR Application No. 10-2020-0015968.

* cited by examiner

<1501> <1503>

<1505>

<1701> <1703>

<1801>

<1803>

ELECTRONIC DEVICE AND METHOD FOR OPERATING HIGH SPEED SCREEN OF ELECTRONIC DEVICE

CROSS-REFERENCE TO RELATED APPLICATION

This application is a Continuation of U.S. application Ser. No. 17/167,483, filed Feb. 4, 2021, which claims priority to KR 10-2020-0015968, filed Feb. 10, 2020, the entire contents of which are all hereby incorporated herein by reference in their entireties.

BACKGROUND

Field

The disclosure relates to an electronic device and control of the screen of an electronic device and, for example, to an electronic device capable of controlling the refresh rate of a screen to be displayed on a display.

Description of Related Art

Various electronic devices, such as a smart phone, a tablet PC, a portable multimedia player (PMP), a personal digital assistant (PDA), a laptop personal computer (laptop PC), a wearable device, and the like, have become popularized.

An electronic device may include a display that supports a high refresh rate in order to provide a user with various usability improvements including seamless screen transition effects.

An electronic device may include a display that supports a relatively high refresh rate, and may display a relatively large number of frames per second, thereby providing a smooth screen output to a user.

An electronic device that supports a relatively high refresh rate may operate by variably changing a refresh rate, in addition to using a high refresh rate.

If the electronic device reproduces a screen displayed at a relatively high refresh rate, the electronic device may consume high power and thus heat may be produced.

In addition, if the electronic device changes a refresh rate from a relatively high refresh rate to a low refresh rate, or from a relatively low refresh rate to a high refresh rate, screen transition performed on the display may be unnatural.

The above information is presented as background information only to assist with an understanding of the disclosure. No determination has been made, and no assertion is made, as to whether any of the above might be applicable as prior art with regard to the disclosure.

SUMMARY

Embodiments of the disclosure provide an electronic device and a method of operating a high speed screen by an electronic device that operate a display at a high refresh rate by preventing and/or reducing heat generation, and to continuously provide a seamless screen when changing the refresh rate of the display.

In accordance with an example embodiment of the disclosure, an electronic device may include: a display configured to display an execution screen of an application; and a processor operatively connected to the display, wherein the processor is configured to: execute the application; receive a frequency event from the application; identify predetermined settings based on the application being executed; determine, based on the frequency event and the predetermined settings, a refresh rate of an execution screen of the application; identify, based on state information of the electronic device and the determined refresh rate, information for controlling operation of a high speed screen; and controlling based on the identified information, the high speed screen related to the execution screen of the application on the display.

In accordance with an example embodiment of the disclosure, a method of operating a high speed screen of an electronic device may include: executing an application; receiving a frequency event from the application; identifying predetermined settings based on the application being executed; determining, based on the frequency event and the predetermined settings, a refresh rate of an execution screen of the application; identifying, based on state information of the electronic device and the determined refresh rate, information for controlling operation of a high speed screen; and controlling, based on the identified information, the high speed screen related to the execution screen of the application on the display.

An electronic device and a method of operating a high speed screen by the electronic device according to various example embodiments may determine a refresh rate based on information associated with the refresh rate of an application and the state information of the electronic device, and may stably perform operation even though displaying a screen on the display at a relatively high refresh rate.

An electronic device and a method of operating a high speed screen by the electronic device according to various example embodiments may determine a refresh rate based on information associated with the refresh rate of an application and the state information of the electronic device, and may perform quick and seamless transition when changing the refresh rate of a screen on a display.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
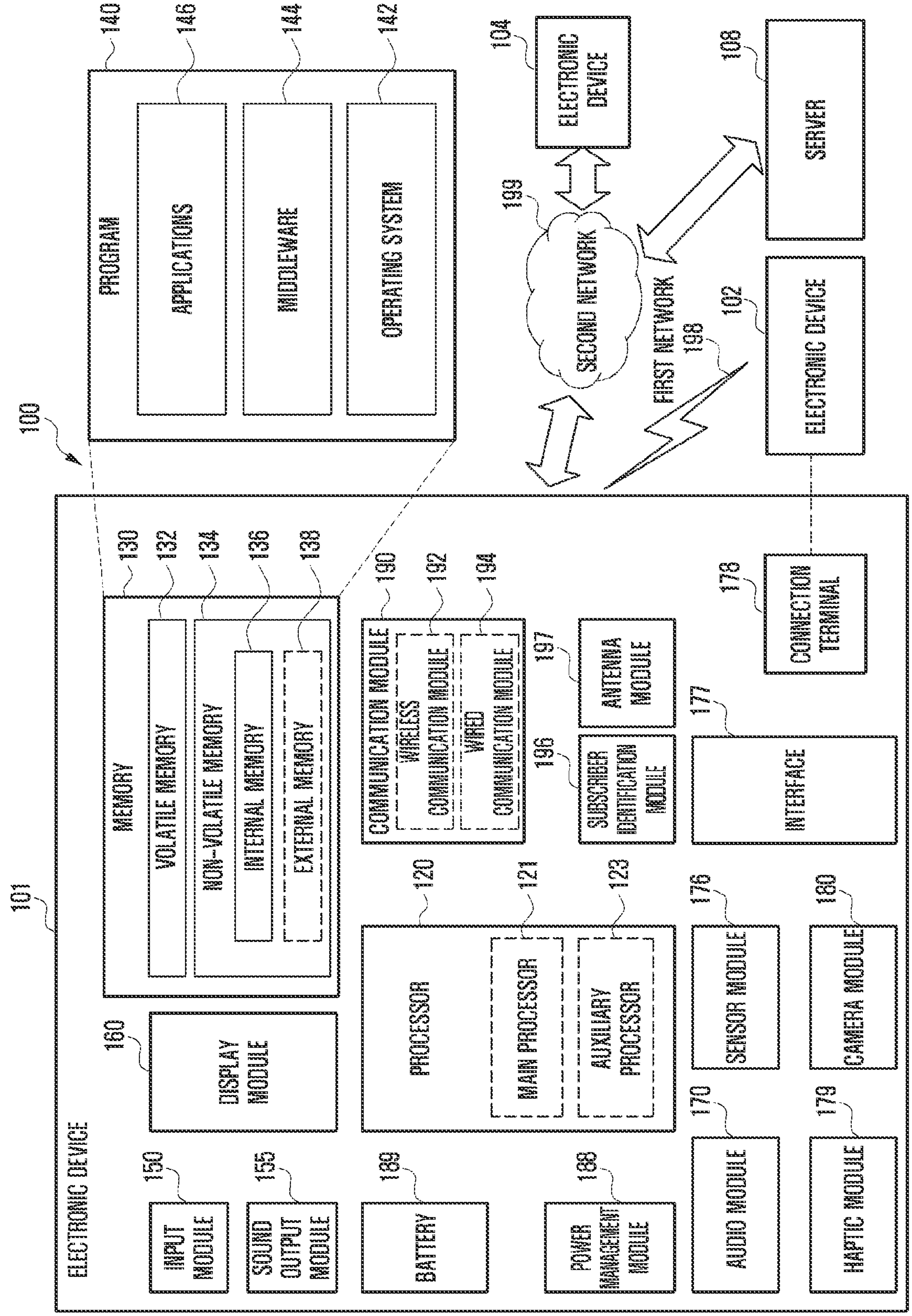
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
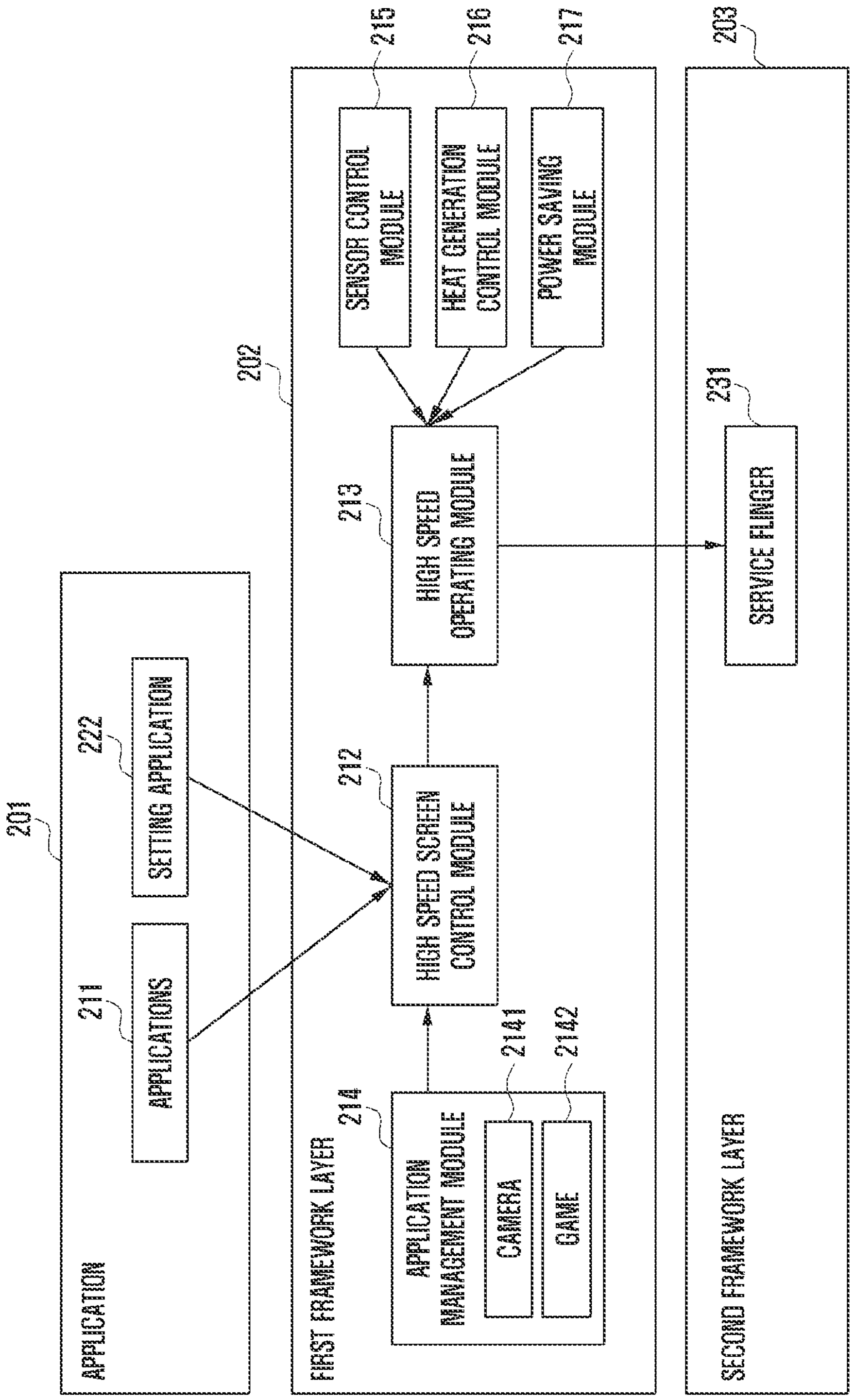
FIG. 2 is a block diagram illustrating example hierarchy of software of an electronic device according to various embodiments.

FIG. 2 is a block diagram illustrating an example of the hierarchy of software of the electronic device 101 according to various embodiments.

An application layer 201 of the electronic device 101 may include applications 211 and a setting application 222.

The applications 211 and the setting application 222 included in the application layer 201 may be preloaded in the electronic device 101 when the electronic device is manufactured, or may be downloaded from or updated by an external electronic device (e.g., the electronic device 102 or 104, or the server 108) when the electronic device is used by a user.

The applications 211 may include, for example, and without limitation, a home screen application, a phone application, a message application, an Internet browser application, a camera application, an alarm application, a contacts application, a voice recognition application, an e-mail application, a calendar application, a media player application, a gallery (or album) application, a watch application, a health care application (e.g., measuring biometric information such as the amount of exercise, blood sugar), an environment information application (e.g., measuring atmospheric pressure, humidity, or temperature information), a lock screen application, a navigation bar application, a note (or memo) application, a recent application, Gmail™ application, Google Maps™ application, Instagram™ application, Facebook™ application, Kakao Talk™ application, a game application, or the like.

The setting application 222 may include some of the applications 211. The setting application 222 may be an application that is capable of setting a display (e.g., the display device 160) of the electronic device 101, communication (e.g., the communication module 190) of the electronic device 101, the battery of the electronic device 101, notifications of the electronic device 101, the background screen of the electronic device 101, updating of the electronic device 101, the operations of the applications 211, etc.

For example, the setting applications may include, without limitation, a home screen application, a lock screen application, a navigation bar application, a phone application, a message application, a calendar application, a contacts application, an e-mail application, a note (or memo) application, a gallery (or album) application, an Internet browser application included in the applications 211 and/or the setting application 222 may include native applications. The native application may include an application preloaded when the electronic device 101 is manufactured.

The Gmail™ application, Google Maps™ application, Instagram™ application, Facebook™ application, and/or Kakao Talk™ application included in the applications 211 may be third party applications. The third party application may be an application downloaded from another electronic device.

The setting application 222 may control, for example, the power (turning on or turning off) or the functions (the brightness, resolution, or focus of the display device 160 or the camera module 180) of an external electronic device that communicates with the electronic device 101 or some elements (e.g., the display device 160 or the camera module 180) thereof. The setting application 222 may support installation, deletion, or updating of an application that operates in an external electronic device.

The applications 211 and the setting application 222 included in the application layer 201 may draw at least one layer based on the resolution of a display area of the display (e.g., the display device 160).

According to various embodiments, the applications 211 and the setting application 222 included in the application layer 201 may draw at least one layer based on the resolution of a display area of the display (e.g., the display device 160), using a drawing library (e.g., view).

The applications 211 and/or the setting application 222 included in the application layer 201 may include an event associated with a frequency (or information associated with a refresh rate) according to a scenario.

The event associated with a frequency (or information associated with a refresh rate) may be stored in advance in each of the applications 211 and/or setting application 222, and may be set for each of the applications 211 and/or setting application 222 by a user input.

The electronic device 101 may, for example, manage each of the applications 211 using a white list. The white list may be included in the setting application 222 and/or application layer 201. For example, the electronic device 101 may manage native applications and/or third party applications using a white list which is reliable. For example, the electronic device 101 may receive a user input associated with an application to be designated as a white list via setting applications 222, and may manage the application selected by the user as a white list.

An application which is managed as a white list among the applications 211 may transfer an event associated with a frequency, which is stored in advance in the application (or information associated with a refresh rate), to a high speed screen control module 212 and/or a high speed screen operating module 213 of a first framework layer 202.

According to various embodiments, if native applications and/or third party applications are executed, the electronic device 101 may transfer an event associated with a frequency, which is stored in advance in the executed application (or information associated with a refresh rate), to the high speed screen control module 212 and/or the high speed screen operating module 213 of the first framework layer 202.

According to various embodiments, when an application is executed, an event associated with a frequency (or the information associated with a refresh rate), which is transferred to the high speed screen control module 212 and the high speed screen operating module 213 of the first framework layer 202, may include, for example, at least one of CGF_120, CFG_96, CGF_60, CGF_48, CFG30, or CGF_24.

According to various embodiments, if the electronic device 101 may perform an operation related to video reproduction in a local and/or streaming reproduction manner, the electronic device 101 may transfer an event associated with a frequency to the high speed screen control module 212 and/or high speed screen operating module 213 of the first framework layer 202 using a media service. The media service may store an event associated with a frequency (or information associated with a refresh rate) in advance. The media service may configure and store the event associated with a frequency (or information associated with a refresh rate) by a user in advance. The media service may receive the event associated with a frequency (or information associated with a refresh rate) from the outside and may store the same. The media service may be an application and may be a program stored in a framework.

The electronic device 101 may include software related to a system, for example, settings, a digital well being service, an input manager, a view animation and/or a heat generation control module (e.g., a heat generation control module 216) in the application layer 201 or the first framework layer 202. If an event associated with a frequency (or information associated with a refresh rate) occurs from the software related to a system, the electronic device 101 may transfer the event associated with a frequency (or information associated with a refresh rate) to the high speed screen control module 212 and/or high speed operating module 213 of the first framework layer 202.

The electronic device 101 may designate in advance and configure an event associated with a frequency (or information associated with a refresh rate) of a display (e.g., the display device 160) using the setting application 222.

According to various embodiments, the electronic device 101 may designate in advance and configure an event associated with a frequency (or information associated with a refresh rate) of each of the applications 211 using the setting application 222.

According to various embodiments, the electronic device 101 may designate in advance and configure an event associated with a frequency (or information associated with a refresh rate) of a game application management module 2142 (e.g., a game booster setting application) using the setting application 222.

According to various embodiments, the electronic device 101 may designate in advance and configure an event associated with a frequency (or information associated with a refresh rate) of a camera application management module 2141 using the setting application 222.

According to various embodiments, the electronic device 101 may include a normal speed mode and/or a high speed mode for a refresh rate. For example, the normal speed mode may be a mode for operating the refresh rate of a display (e.g., the display device 160) included in the electronic device 101 to be less than or equal to a first frequency (e.g., 60 Hz). The high speed mode may be a mode for operating the refresh rate of a display (e.g., the display device 160) included in the electronic device 101 to be greater than or equal to the first frequency (e.g., 60 Hz) and/or less than or equal to a second frequency (e.g., 120 Hz).

According to various embodiments, if the electronic device 101 is in the normal speed mode, the electronic device 101 may support all resolutions that the display (e.g., the display device 160) is capable of implementing.

According to various embodiments, the resolutions that the display (e.g., the display device 160) is capable of implementing may include, for example, a wide quad high definition (WQHD) resolution, a full high definition (FHD) resolution, and/or a high definition (HD) resolution. If the electronic device 101 is in the normal speed mode, the electronic device 101 may support a wide quad high definition (WQHD) resolution, a full high definition (FHD) resolution, and/or a high definition (HD) resolution.

According to various embodiments, if the electronic device 101 is in the high speed mode in association with a refresh rate, the electronic device 101 may support a resolution which is less than or equal to a predetermined resolution among all resolutions that the display (e.g., the display device 160) is capable of implementing. If the electronic device 101 is in the high speed mode, the electronic device 101 may support a full high definition (FHD) resolution and/or a high definition (HD) resolution.

According to various embodiments, the electronic device 101 may change the normal speed mode and/or high speed mode under the control of the processor 120. The electronic device 101 may change the normal speed mode and/or high speed mode according to user selection. The electronic device 101 may include the setting application 222 via which a user is capable of selecting the normal speed mode and/or high speed mode. The electronic device 101 may provide a user interface via which a user is capable of selecting the normal speed mode and/or high speed mode on the display (e.g., the display device 160).

According to various embodiments, the electronic device 101 may change a refresh rate when a mode is changed between the normal speed mode and/or the high speed mode. If a refresh rate is changed according to a transition between the normal speed mode and/or high speed mode, the electronic device 101 may terminate execution of an application and may perform transition according to the selected refresh rate. If a refresh rate is changed according to a transition between the normal speed mode and/or high speed mode, the electronic device 101 may maintain execution of an application and perform transition according to the selected refresh rate.

The electronic device 101 may process a first frame (frame 1) to be black when changing a refresh rate according to a transition between the normal speed mode and/or high speed mode. When transition is performed between the normal speed mode and/or high speed mode, the length of a vertical front porch (VFP) may become longer and a difference in brightness may occur. The difference in brightness may be recognized as the flicker of a screen. According to various embodiments, when changing a refresh rate according to a transition between the normal speed mode and/or high speed mode, the electronic device 101 may process the first frame (frame 1) to be black, and may reduce the flicker of a screen which occurs when the refresh rate of the electronic device 101 is changed.

The first framework layer 202 may include the high speed screen control module 212 (a high speed window manager), the high speed screen operating module 213 (a high speed display manager), an application management module 214, a sensor control module 215, a heat generation control module 216, and/or power saving module 217.

The high speed screen control module 212 (high speed window manager) may perform a high speed screen control operation based on a frequency event received from the application layer 201.

According to various embodiments, the high speed screen control module 212 may determine a refresh rate according to a policy. If the electronic device 101 performs a screen transition of an application that is being executed and/or the screen that the electronic device 101 is displaying corresponds to an animation screen operation, the high speed screen control module 212 may determine a refresh rate to be less than or equal to the second frequency (e.g., 120 Hz), and may control the display (e.g., the display device 120).

According to various embodiments, if an application that is being executed is registered as an application that operates at a non-high refresh rate, the high speed screen control module 212 may determine a refresh rate to be less than or equal to the first frequency (e.g., 60 Hz) and may control the display (e.g., the display device 120). Each of the applications 211 may include a separate refresh rate and/or a separate package when being installed or registered in the electronic device 101. An application may be installed or registered in the electronic device 101 as an application operating at a non-high refresh rate and/or as a separate package.

According to various embodiments, if an application that is being executed declares a refresh rate, and if the application that is being executed is registered in the application management module 214 as an application operating at a separate fixed refresh rate and/or a package, the high speed screen control module 212 may control the display (e.g., the display device 120) at the registered fixed refresh rate. An application may be installed or registered in the electronic device 101 as an application operating at a fixed refresh rate and/or as a separate package.

According to various embodiment, if an application that is being executed is an application that is determined, selected, and/or configured as an application operating at a high refresh rate in the setting applications 222, the high speed screen control module 212 may determine a refresh rate to be less than or equal to the second frequency (e.g., 120 Hz) and may control the display (e.g., the display device 120).

According to various embodiments, if an application that is being executed is at least one of a lock screen, a home screen, settings, and a navigation bar, the high speed screen control module 212 may determine a refresh rate based on a priority order, and may control the display (e.g., the display device 120).

For example, if an application that is being executed is a lock screen, the lock screen application may perform a video wall paper animation operation, and may perform an animation operation that changes the lock screen to a home screen.

For example, if an application that is being executed is a home screen, the home screen application may perform an application launch animation, and may perform a page transition animation.

For example, if an application that is being executed is settings, the setting application 222 may perform a list navigation animation, and a depth-in-and-out animation. A depth-in-and-out animation operation may be an operation (depth in) of further displaying information when an item displayed on a list is selected or an operation (depth-out) of displaying previous information of displayed information.

For example, if an application that is being executed is a navigation bar, the application may perform a recent animation, a home screen animation, and a back navigation animation. The recent animation may be an animation that reduces an execution screen associated with a recently executed application and displays at least one reduced execution screen. The home screen animation may be an animation that changes an application execution screen to a home screen. The back navigation animation may be an animation that displays the screen of a previous stage.

The application management module 214 may include the camera application management module 2141 and/or the game application management module 2142. The application management module 214 may include a program and/or software controlled by the processor 120, and the application management module 214 may include commands for configuring and/or controlling the operations of applications in the electronic device 101 which are installed and/or registered in the electronic device 101. The commands associated with the application management module 214 may be stored in the memory 130, and may be performed under the control of the processor 120.

The application management module 214 may transfer, to the high speed screen control module 212, information associated with the package of an application that is registered as a package in the application management module 214 and information associated with a refresh rate requested by the application, from among the applications 211.

According to various embodiments, when a camera is executed, the camera application management module 2141 may transfer information associated with the package of an application that uses the camera and information associated with a refresh rate requested by the application, to the high speed screen control module 212.

According to various embodiments, when a game is executed, the game application management module 2142 may transfer information associated with the package of a game application and a refresh rate requested by the application, to the high speed screen control module 212.

The high speed screen operating module 213 may receive information associated with a refresh rate (or an operating frequency) transferred from the high speed screen control module 212, and may control operation of the display (e.g., the display device 160) based on the state information of the electronic device 101.

The electronic device 101 may sense the brightness and/or illuminance of the display (e.g., the display device 160), and may transfer the sensing information to the sensor control module 215.

The electronic device 101 may sense the brightness and/or illuminance of the ambient environment of the electronic device 101 via the sensor module 176, and may transfer the information sensed via the sensor module 176 to the sensor control module 215.

The sensor control module 215 may transfer information associated with the brightness and/or illuminance of the display (e.g., the display device 160) or the electronic device 101 to the high speed screen operating module 213.

If the brightness and/or illuminance of the display (e.g., the display device 160) or the electronic device 101 is greater than or equal to a predetermined brightness and/or illuminance, the sensor control module 215 may request the high speed screen operating module 213 to operate a refresh rate to be less than or equal to the first frequency (e.g., 60 Hz) and/or the second frequency (e.g., 120 Hz).

If the brightness and/or illuminance of the display (e.g., the display device 160) or the electronic device 101 is less than or equal to a predetermined brightness and/or illuminance, the sensor control module 215 may request the high speed screen operating module 213 to operate a refresh rate to be less than or equal to the first frequency (e.g., 60 Hz).

The heat generation control module 216 may receive information associated with the battery state and the heat generation of the electronic device 101. The heat generation control module 216 may transmit the information associated with the heat generation of the electronic device 101 and/or the information associated with the battery 189 to the high speed screen operating module 213.

If the heat generation state of the electronic device 101 is greater than or equal to a predetermined temperature, the heat generation control module 216 may request the high speed screen operating module 213 to operate a refresh rate be less than or equal to the first frequency (e.g., 60 Hz).

If the charging power of the battery 189 is less than or equal to a predetermined power, the heat generation control module 216 may request the high speed screen operating module 213 to operate a refresh rate be less than or equal to the first frequency (e.g., 60 Hz).

The power saving module 217 may determine whether the electronic device 101 is in a power saving mode, and may transfer information associated with the power saving mode to the high speed screen operating module 213.

If the electronic device 101 enters the power saving mode, the power saving module 217 may request the high speed screen operating module 213 to operate a refresh rate be less than or equal to the first frequency (e.g., 60 Hz).

A second framework layer 203 may include a surface flinger 231.

The second framework layer 203 may include a hardware abstraction layer (HAL). The second framework layer 203 may include an abstraction layer between a plurality of hardware modules included in a hardware layer and software of the electronic device 101.

The surface flinger 231 may combine a plurality of layers. The surface flinger 231 may transfer data corresponding to the combined plurality of layers to the display (e.g., the display device 160) or a display controller (not illustrated). The display (e.g., the display device 160) or the display controller (not illustrated) may display a screen based on the data transferred from the surface flinger 231.

Figure 3:
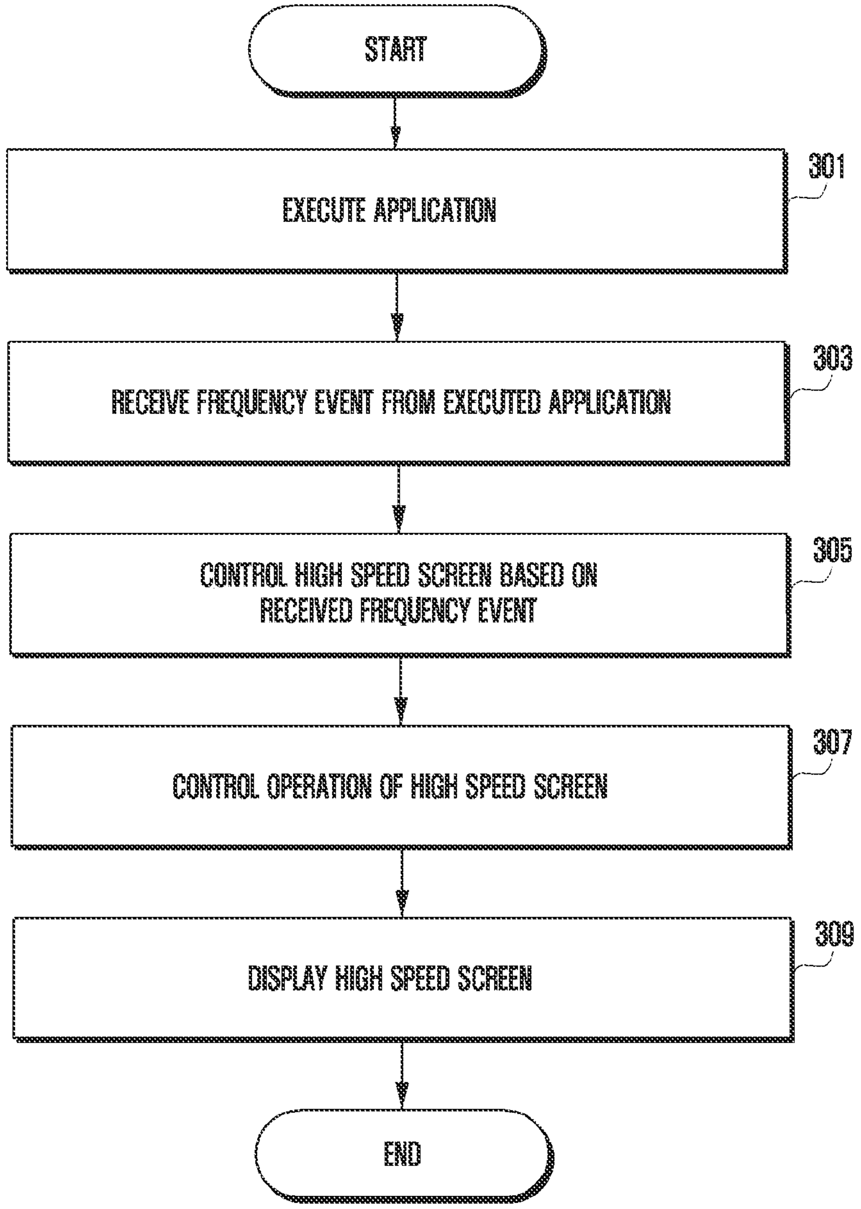
FIG. 3 is a flowchart illustrating an example process of operating the high speed screen of an electronic device according to various embodiments.

FIG. 3 is a flowchart illustrating an example process of operating the high speed screen of the electronic device 101 according to various embodiments.

In operation 301, the electronic device 101 executes an application under the control of the processor 120.

According to various embodiments, the electronic device 101 may execute one of the applications 211 and the setting application 222 of FIG. 2 under the control of the processor 120.

In operation 303, the electronic device 101 may enable a framework (e.g., the first framework layer 202) to receive a frequency event from the executed application, under the control of the processor 120. The frequency event may include, for example, the refresh rate of a display (e.g., the display device 160).

According to various embodiments, in operation 303, the electronic device 101 may enable the high speed screen control module 212 to receive a frequency event from the executed application, under the control of the processor 120.

In operation 305, the electronic device 101 may control operation of a high speed screen based on the received frequency event, under the control of the processor 120.

According to various embodiments, in operation 305, the electronic device 101 may request a frequency operation determined according to the operation of controlling the high speed screen based on the received frequency event, under the control of the processor 120.

According to various embodiments, in operation 305, the electronic device 101 may perform an operation in which the framework (e.g., the first framework layer 202) controls a high speed screen based on the received frequency event, under the control of the processor 120.

According to various embodiments, in operation 305, the electronic device 101 may perform an operation in which the high speed screen control module 212 controls a high speed screen based on the received frequency event, under the control of the processor 120.

According to various embodiments, in operation 305, the electronic device 101 may control a high speed screen based on the received frequency event and a frequency event requested by the application management module 214, under the control of the processor 120.

In operation 307, the electronic device 101 may control operation of the high speed screen under the control of the processor 120.

According to various embodiments, in operation 307, the electronic device 101 may perform an operation in which the framework (e.g., the first framework layer 202) controls operation of the high speed screen, under the control of the processor 120.

According to various embodiments, in operation 307, the electronic device 101 may perform an operation in which the high speed screen operation module 213 controls operation of the high speed screen, under the control of the processor 120.

According to various embodiments, in operation 307, the electronic device 101 may control operation of the high speed screen based on the frequency operation request transmitted from the high speed screen control module 212 and the state information of the electronic device 101, under the control of the processor 120. The state information of the electronic device 101 may be transmitted from one or more among the sensor control module 215, the heat generation control module 216, or the power saving module 217.

According to various embodiments, in operation 307, the electronic device 101 may determine a frequency operation according to the operation of controlling operation of the high speed screen based on the frequency operation request transmitted from the high speed screen control module 212 and the state information of the electronic device 101, under the control of the processor 120. According to various embodiments, in operation 307, the electronic device 101 may transmit the frequency operation determined by the high speed screen operating module 213 to the surface flinger 231, under the control of the processor 120.

In operation 309, the electronic device 101 may display the high speed screen under the control of the processor 120.

According to various embodiments, in operation 309, the electronic device 101 may display the high speed screen according to the frequency operation determined by the high speed screen operation module 213, under the control of the processor 120.

According to various embodiments, in operation 309, the electronic device 101 may perform an operation in which the framework (e.g., the second framework layer 203) displays the high speed screen according to the frequency operation determined by the high speed screen operation module 213, under the control of the processor 120.

According to various embodiments, in operation 309, the electronic device 101 may perform an operation in which the surface flinger 231 displays the high speed screen according to the frequency operation determined by the high speed screen operation module 213, under the control of the processor 120.

Figure 4:
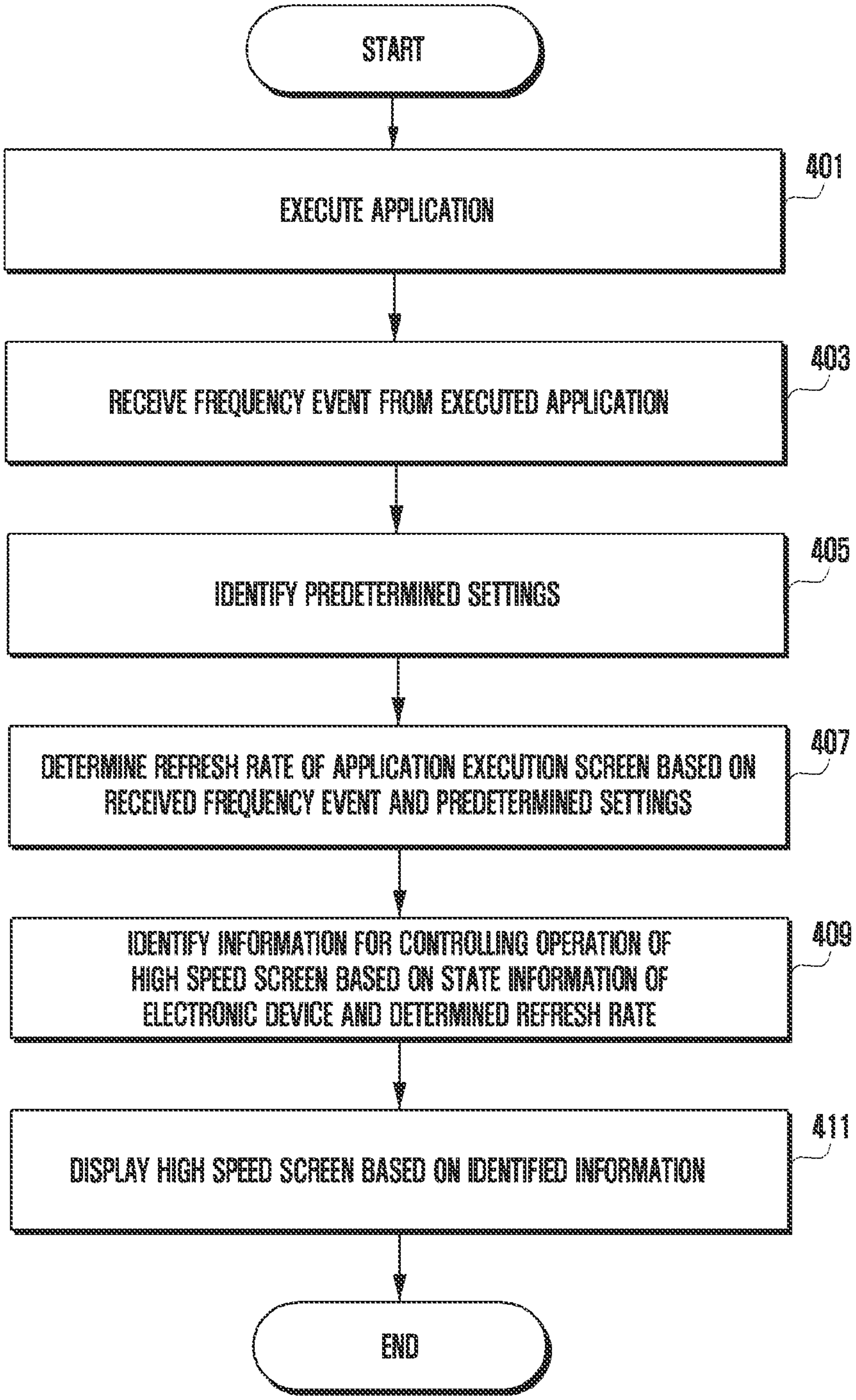
FIG. 4 is a flowchart illustrating an example process of operating the high speed screen of an electronic device according to various embodiments.

FIG. 4 is a flowchart illustrating an example process of operating the high speed screen of the electronic device 101 according to various embodiments.

In operation 401, the electronic device 101 executes an application under the control of the processor 120. According to various embodiments, the electronic device 101 may execute one of the applications 211 and the setting application 222 of FIG. 2, under the control of the processor 120.

In operation 403, the electronic device 101 may enable a framework (e.g., the first framework layer 202) to receive a frequency event from the executed application, under the control of the processor 120. The frequency event may include a refresh rate.

According to various embodiments, in operation 403, the electronic device 101 may enable the high speed screen control module 212 to receive a frequency event from the executed application, under the control of the processor 120.

In operation 405, the electronic device 101 may identify predetermined settings if the application is executed, under the control of the processor 120.

According to various embodiments, in operation 405, the electronic device 101 may identify predetermined settings associated with the frequency event based on the setting application 222, under the control of the processor 120.

In operation 407, the electronic device 101 may determine the refresh rate of the executed screen of the application based on the received frequency event and the predetermined settings, under the control of the processor 120.

According to various embodiments, in operation 407, the electronic device 101 may control a high speed screen based on the received frequency event and the predetermined settings, under the control of the processor 120.

According to various embodiments, in operation 407, the electronic device 101 may request a frequency operation determined according to the operation of controlling the high speed screen based on the received frequency event and the predetermined settings, under the control of the processor 120.

According to various embodiments, in operation 407, the electronic device 101 may perform an operation in which the framework (e.g., the first framework layer 202) controls the high speed screen based on the received frequency event and the predetermined settings, under the control of the processor 120.

According to various embodiments, in operation 407, the electronic device 101 may perform an operation in which the high speed screen control module 212 controls the high speed screen based on the received frequency event and the predetermined settings, under the control of the processor 120.

According to various embodiments, in operation 407, the electronic device 101 may control the high speed screen based on the received frequency event, the predetermined settings, and a frequency event requested by the application management module 214, under the control of the processor 120.

In operation 409, the electronic device 101 may identify information for controlling operation of the high speed screen based on the determined screen refresh rate and the state information of the electronic device 101, under the control of the processor 120.

According to various embodiments, in operation 409, the electronic device 101 may control operation of the high speed screen based on the state information of the electronic device 101 and the predetermined settings, under the control of the processor 120.

According to various embodiments, in operation 409, the electronic device 101 may perform an operation in which the framework (e.g., the first framework layer 202) controls operation of the high speed screen based on the state information of the electronic device 101 and the predetermined settings, under the control of the processor 120.

According to various embodiments, in operation 409, the electronic device 101 may perform an operation in which the high speed screen operating module 213 controls operation of the high speed screen based on the state information of the electronic device 101 and the predetermined settings, under the control of the processor 120.

According to various embodiments, in operation 409, the electronic device 101 may control operation of the high speed screen based on the frequency operation request transmitted from the high speed screen control module 212, the state information of the electronic device 101, and the predetermined settings, under the control of the processor 120. The state information of the electronic device 101 may be transmitted from one or more among the sensor control module 215, the heat generation control module 216, or the power saving module 217.

According to various embodiments, in operation 409, the electronic device 101 may determine a frequency operation according to the operation of controlling operation of the high speed screen based on the frequency operation request transmitted from the high speed screen control module 212, the state information of the electronic device 101, and the predetermined settings, under the control of the processor 120.

According to various embodiments, in operation 409, the electronic device 101 may transmit the frequency operation determined by the high speed screen operating module 213 to the surface flinger 231, under the control of the processor 120.

In operation 411, the electronic device 101 may display the high speed screen on a display (e.g., the display device 160) based on the identified information, under the control of the processor 120.

According to various embodiments, in operation 411, the electronic device 101 may display the high speed screen under the control of the processor 120.

According to various embodiments, in operation 411, the electronic device 101 may display the high speed screen according to the frequency operation determined by the high speed screen operation module 213, under the control of the processor 120.

According to various embodiments, in operation 411, the electronic device 101 may perform an operation in which the framework (e.g., the second framework layer 203) displays the high speed screen according to the frequency operation determined by the high speed screen operation module 213, under the control of the processor 120.

According to various embodiments, in operation 411, the electronic device 101 may perform an operation in which the surface flinger 231 displays the high speed screen according to the frequency operation determined by the high speed screen operation module 213, under the control of the processor 120.

Figure 5:
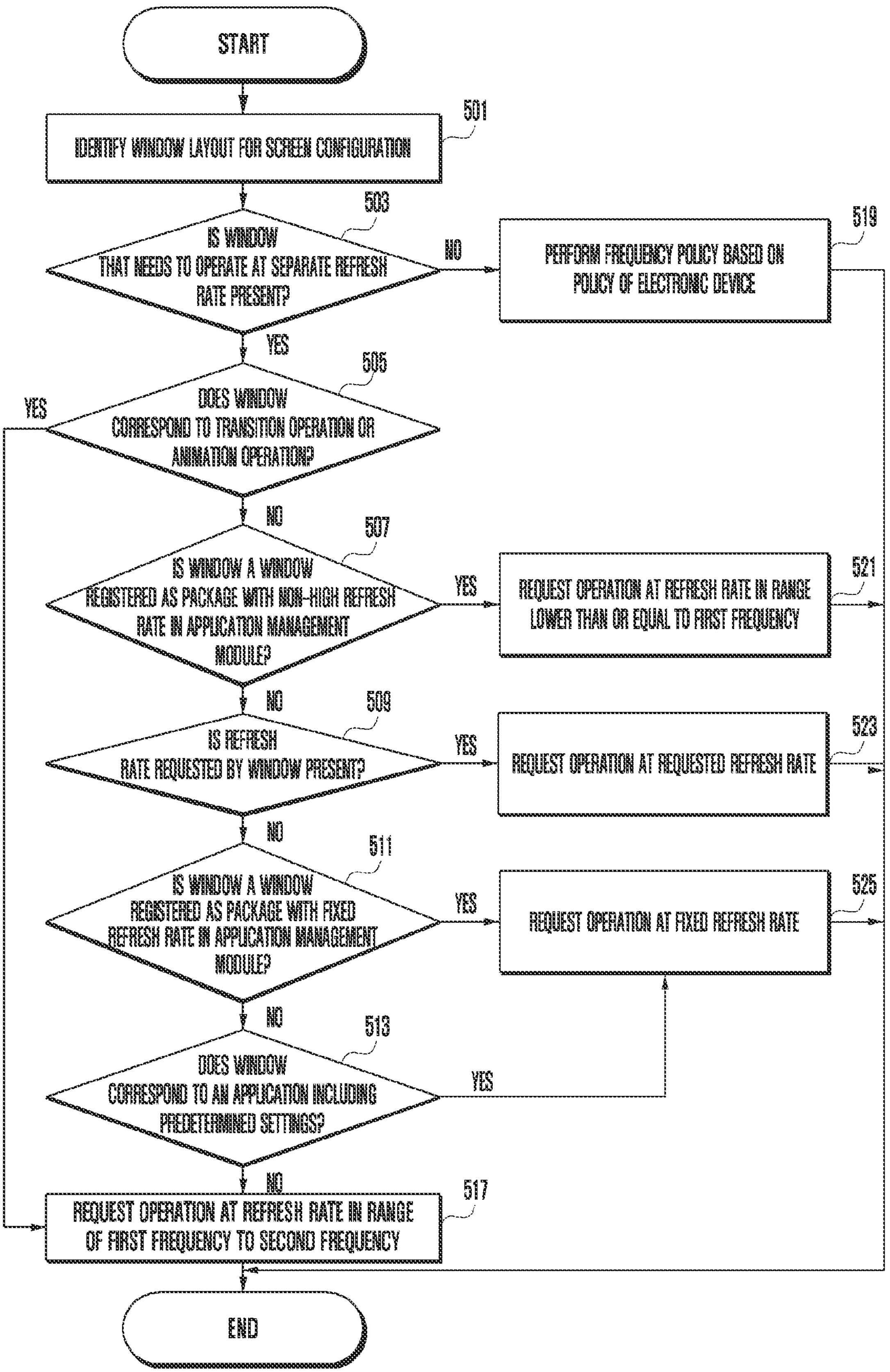
FIG. 5 is a flowchart illustrating an example process of determining the refresh rate of an electronic device according to various embodiments.

FIG. 5 is a flowchart illustrating an example process of determining the refresh rate of the electronic device 101 according to various embodiments.

In operation 501, the electronic device 101 may identify a window layout for configuration of a screen under the control of the processor 120.

According to various embodiments, in operation 501, the electronic device 101 may identify a window layout for configuration of the screen of an application that is being executed, under the control of the processor 120.

According to various embodiments, in operation 501, the electronic device 101 may identify a window layout for configuration of the screen of an application that transmits a frequency event and is being executed, under the control of the processor 120.

In operation 503, the electronic device 101 may determine whether a window that needs to operate at a separate refresh rate is present in the identified window layout, under the control of the processor 120.

If it is determined that a window that needs to operate at a separate refresh rate is present in operation 503, the electronic device 101 may proceed with operation 505 under the control of the processor 120.

If it is determined that a window that needs to operate at a separate refresh rate is not present in operation 503, the electronic device 101 may proceed with operation 519 under the control of the processor 120.

If a window that needs to operate at a separate refresh rate is not present, the electronic device 101 may perform a frequency policy according to the policy of the electronic device 101 under the control of the processor 120 in operation 519. The frequency policy may be a policy associated with a refresh rate.

If a window that needs to operate at a separate refresh rate is present, the electronic device 101 may determine whether the window corresponds to a transition operation or an animation operation under the control of the processor 120 in operation 505.

If the window is determined as corresponding to the transition operation or animation operation in operation 505, the electronic device 101 may proceed with operation 517 under the control of the processor 120.

For example, the animation operation may include an animation associated with entrance to and exit from an application, an animation associated with application-to-application transition, an animation associated with a window displayed separately (modal), an animation associated with display of a bottom sheet, an animation associated with display of a card type window, an animation associated with display of "create new", an animation associated with display of a dialog box (dialog), an animation associated with display of a popup, an animation associated with editing a list, an animation associated with extending an application bar, an animation associated with a full screen gesture, an animation associated with adding and deleting a grid, an animation associated with a grid full, an animation associated with grid reordering, an animation associated with grid zooming, an animation associated with adding and deleting a list, an animation associated with expanding a list, an animation associated with list reordering, an animation associated with a cross application, and an animation associated with depth-in-and-out.

In operation 517, the electronic device 101 may request a display (e.g., the display device 160) to operate at a refresh rate in the range of a first frequency (e.g., 60 Hz) to a second frequency (e.g., 120 Hz), under the control of the processor 120.

If the window is determined as not corresponding to the transition operation or animation operation in operation 505, the electronic device 101 may proceed with operation 507 under the control of the processor 120.

In operation 507, the electronic device 101 may determine whether the window is a window registered as a package with a non-high refresh rate in the application management module 214, under the control of the processor 120.

In operation 507, the electronic device 101 may determine whether an application that is being executed corresponds to a window registered as a package with a non-high refresh rate in the application management module 214, under the control of the processor 120. If the application that is registered as a package with a non-high refresh rate in the application management module 214 is, for example, an application which uses a camera, the electronic device 101 may request the display (e.g., the display device 160) to operate at a refresh rate in the range lower than or equal to the first frequency (e.g., 60 Hz) when the application which uses a camera is executed (e.g., operation 521).

If it is determined that the window is a window registered as a package with a non-high refresh rate in the application management module 214, the electronic device 101 may proceed with operation 521, under the control of the processor 120.

If it is determined that the window is not a window registered as a package with a non-high refresh rate in the application management module 214, the electronic device 101 may proceed with operation 509, under the control of the processor 120.

In operation 521, the electronic device 101 may request the display (e.g., the display device 160) to operate at a refresh rate falling in the range lower than or equal to the first frequency (e.g., 60 Hz), under the control of the processor 120.

If it is determined that the window is not a window registered as a package with a non-high refresh rate, the electronic device 101 may determine whether a refresh rate requested by the window of the application that is being executed is present, under the control of the processor 120 in operation 509.

If it is determined that the refresh rate requested by the window of the application that is being executed is present in operation 509, the electronic device 101 may proceed with operation 523 under the control of the processor 120.

If it is determined that the refresh rate requested by the window of the application that is being executed is not present in operation 509, the electronic device 101 may proceed with operation 511 under the control of the processor 120.

In operation 523, the electronic device 101 may request the display (e.g., the display device 160) to operate at the refresh rate requested by the window, under the control of the processor 120.

In operation 511, the electronic device 101 may determine whether the application that is being executed corresponds to a window registered as a package with a fixed refresh rate in the application management module 214, under the control of the processor 120.

If the application registered as a package with a fixed refresh rate in the application management module 214 is, for example, a game application, the electronic device 101 may request the display (e.g., the display device 160) to operate at a fixed refresh rate (e.g., a second frequency (e.g., 120 Hz)) requested by the game application when the game application is executed.

If it is determined that the application that is being executed corresponds to a window registered as a package with a fixed refresh rate in the application management module 214 in operation 511, the electronic device 101 may proceed with operation 525 under the control of the processor 120.

If it is determined that the application that is being executed does not correspond to a window registered as a package with a fixed refresh rate in the application management module 214 in operation 511, the electronic device 101 may proceed with operation 513 under the control of the processor 120.

In operation 525, the electronic device 101 may request the display (e.g., the display device 160) to operate at the fixed refresh rate, under the control of the processor 120.

In operation 513, the electronic device 101 may identify whether the application that is being executed is an application including predetermined settings, under the control of the processor 120.

If it is determined that the application that is being executed is an application including predetermined settings in operation 513, the electronic device 101 may proceed with operation 525 under the control of the processor 120.

If it is determined that the application that is being executed is not an application including predetermined settings in operation 513, the electronic device 101 may proceed with operation 517 under the control of the processor 120.

Figure 6:
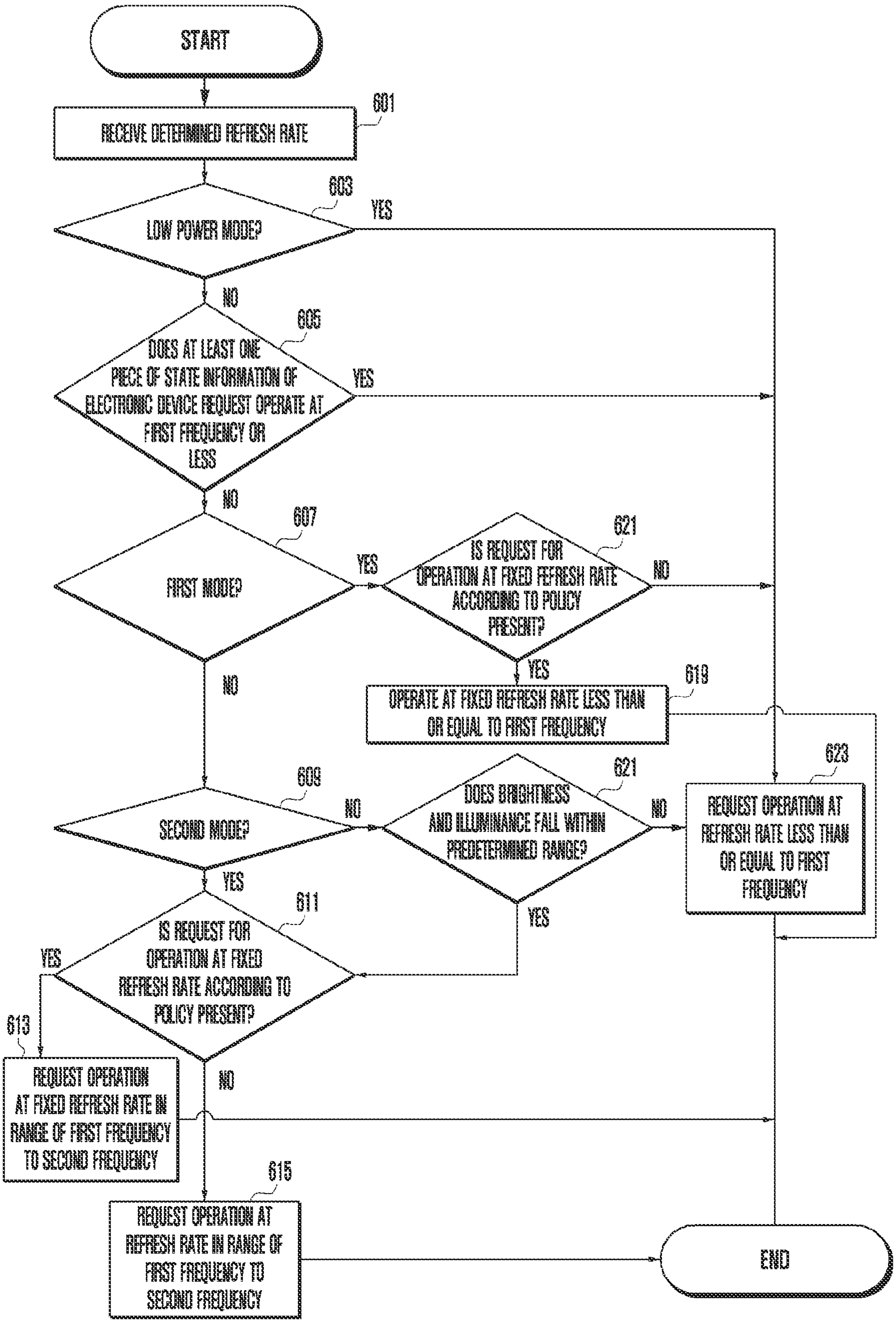
FIG. 6 is a flowchart illustrating an example process of identifying information for controlling operation of the high speed screen of an electronic device according to various embodiments.

FIG. 6 is a flowchart illustrating an example process of identifying information for controlling operation of the high speed screen of an electronic device according to various embodiments.

In operation 601, the electronic device 101 may receive a determined refresh rate, under the control of the processor 120.

According to various embodiments, in operation 601, the electronic device 101 may receive a high speed screen control request, under the control of the processor 120. According to various embodiments, in operation 601, the electronic device 101 may receive a display operation request (e.g., a request for operating the display device 160) including a refresh rate, under the control of the processor 120.

According to various embodiments, in operation 601, the electronic device 101 may receive a display operation request (e.g., a request for operating the display device 160) including a refresh rate from the high speed screen control module 212, under the control of the processor 120.

According to various embodiments, in operation 601, the electronic device 101 may receive, via the high speed screen operating module 213, a display operation request (e.g., a request for operating the display device 160) including a refresh rate from the high speed screen control module 212, under the control of the processor 120.

In operation 603, the electronic device 101 may determine whether the electronic device 101 is in a low-power mode, under the control of the processor 120.

According to various embodiments, in operation 603, the electronic device 101 may determine whether the electronic device 101 is in a power saving mode, under the control of the processor 120. In operation 603, the electronic device 101 may receive information associated with the low-power mode and/or power saving mode of the electronic device 101 from at least one of the heat generation control module 216 and/or power saving module 217, and may determine whether the electronic device 101 is in the low-power mode and/or power saving mode, under the control of the processor 120.

If it is determined that the electronic device 101 is in the low-power mode (or power saving mode) in operation 603, the electronic device 101 may proceed with operation 623 under the control of the processor 120.

If it is determined that the electronic device 101 is not in the low-power mode (or power saving mode) in operation 603, the electronic device 101 may proceed with operation 605 under the control of the processor 120.

In operation 623, the electronic device 101 may request the display (e.g., the display device 160) to operate at a refresh rate less than or equal to a first frequency (e.g., 60 Hz), under the control of the processor 120.

If it is determined that the electronic device 101 is not in the low-power mode (or power saving mode), the electronic device 101 may determine whether at least one piece of state information of the electronic device 101 requests the display (e.g., the display device 160) to operate at the first frequency (e.g., 60 Hz) or less, under the control of the processor 120 in operation 605. If it is determined that at least one piece of state information of the electronic device 101 requests the display (e.g., the display device 160) to operate at the first frequency (e.g., 60 Hz) or less in operation 605, the electronic device 101 may proceed with operation 623 under the control of the processor 120. If it is determined that at least one piece of state information of the electronic device 101 does not request the display (e.g., the display device 160) to operate at the first frequency (e.g., 60 Hz) or less in operation 605, the electronic device 101 may proceed with operation 607 under the control of the processor 120.

The electronic device 101 may sense the brightness and/or illuminance of the display (e.g., the display device 160), and may transfer the sensing information to the sensor control module 215.

The electronic device 101 may sense the brightness and/or illuminance of the ambient environment of the electronic device 101 via the sensor module 176, and may transfer the sensing information obtained by the sensor module 176 to the sensor control module 215.

The sensor control module 215 may transfer information associated with the brightness and/or illuminance of the display (e.g., the display device 160) or the electronic device 101 to the high speed screen operating module 213.

If the brightness and/or illuminance of the display (e.g., the display device 160) or the electronic device 101 is greater than or equal to a predetermined brightness and/or illuminance, the sensor control module 215 may request the high speed screen operating module 213 to operate a refresh rate to be less than or equal to the first frequency (e.g., 60 Hz) and/or a second frequency (e.g., 120 Hz).

If the brightness and/or illuminance of the display (e.g., the display device 160) or the electronic device 101 is less than or equal to a predetermined brightness and/or illuminance, the sensor control module 215 may request the high speed screen operating module 213 to operate a refresh rate to be less than or equal to the first frequency (e.g., 60 Hz).

The heat generation control module 216 may receive information associated with the battery state and the heat generation of the electronic device 101. The heat generation control module 216 may transmit the information associated with the heat generation of the electronic device 101 and/or the information associated with the battery 189 to the high speed screen operating module 213.

If the heat generation state of the electronic device 101 is greater than or equal to a predetermined temperature, the heat generation control module 216 may request the high speed screen operating module 213 to operate a refresh rate to be less than or equal to the first frequency (e.g., 60 Hz).

If the charging power of the battery 189 is less than or equal to a predetermined power, the heat generation control module 216 may request the high speed screen operating module 213 to operate a refresh rate to be less than or equal to the first frequency (e.g., 60 Hz).

The power saving module 217 may determine whether the electronic device 101 is in a power saving mode, and may transfer information associated with the power saving mode to the high speed screen operating module 213.

If the electronic device 101 enters the power saving mode, the power saving module 217 may request the high speed screen operating module 213 to operate a refresh rate to be less than or equal to the first frequency (e.g., 60 Hz).

If it is determined that at least one piece of state information of the electronic device 101 does not request operation of the display (e.g., the display device 160) at the first frequency (e.g., 60 Hz) or less, the electronic device 101 may determine whether the electronic device 101 operates in a first mode under the control of the processor 120 in operation 607.

The first mode may, for example, be a mode for controlling the display (e.g., the display device 160) to operate at a refresh rate in the range lower than or equal to the first frequency (e.g., 60 Hz).

If it is determined that the electronic device 101 does not operate in the first mode in operation 607, the electronic device 101 may proceed with operation 609, under the control of the processor 120.

If it is determined that the electronic device 101 operates in the first mode in operation 607, the electronic device 101 may proceed with operation 617, under the control of the processor 120.

If the electronic device 101 operates in the first mode, the electronic device 101 may determine whether a request for operation at a fixed refresh rate according to a policy is present, under the control of the processor 120, in operation 617.

If it is determined that the request for operation at a fixed refresh rate according to the policy is present in operation 617, the electronic device 101 may proceed with operation 619 under the control of the processor 120.

If it is determined that the request for operation at a fixed refresh rate according to the policy is not present in operation 617, the electronic device 101 may proceed with operation 623 under the control of the processor 120.

If the request for operation at a fixed refresh rate according to the policy is present, the electronic device 101 may request the display (e.g., the display device 160) to operate at a fixed refresh rate in the range lower than or equal to the first frequency (e.g., 60 Hz), under the control of the processor 120, in operation 619.

If it is determined that the electronic device 101 does not operate in the first mode, the electronic device 101 may determine whether the electronic device 101 operates in a second mode, under the control of the processor 120, in operation 609. The second mode may, for example, be a mode for controlling the display (e.g., the display device 160) to operate at a refresh rate in the range of the first frequency (e.g., 60 Hz) to the second frequency (e.g., 120 Hz).

If it is determined that the electronic device 101 does not operate in the second mode in operation 609, the electronic device 101 may proceed with operation 621, under the control of the processor 120.

If it is determined that the electronic device 101 operates in the second mode in operation 609, the electronic device 101 may proceed with operation 611, under the control of the processor 120.

If it is determined that the electronic device 101 does not operate in the second mode, the electronic device 101 may determine whether the brightness and/or illuminance of the electronic device 101 falls within a predetermined brightness and/or illuminance range, under the control of the processor 120, in operation 621.

If it is determined that the brightness and/or illuminance of the electronic device 101 falls within a predetermined brightness and/or illuminance range in operation 621, the electronic device 101 may proceed with operation 611, under the control of the processor 120.

If it is determined that the brightness and/or illuminance of the electronic device 101 is beyond a predetermined brightness and/or illuminance range in operation 621, the electronic device 101 may proceed with operation 623, under the control of the processor 120. The predetermined brightness range may be, for example, the range of 98 nit to 420 nit. The predetermined illuminance range may be, for example, the range of 100 lux to 3000 lux.

In operation 611, the electronic device 101 may determine whether a request for operation at a fixed refresh rate according to a policy is present, under the control of the processor 120.

If it is determined that the request for operation at a fixed refresh rate according to the policy is present in operation 611, the electronic device 101 may proceed with operation 613 under the control of the processor 120.

If it is determined that the request for operation at a fixed refresh rate according to the policy is not present in operation 611, the electronic device 101 may proceed with operation 615 under the control of the processor 120.

If the request for operation at a fixed refresh rate according to the policy is present, the electronic device 101 may request the display (e.g., the display device 160) to operate at a fixed refresh rate in the range of the first frequency (e.g., 60 Hz) to the second frequency (e.g., 120 Hz), under the control of the processor 120, in operation 613.

If the request for operation at a fixed refresh rate is not present, the electronic device 101 may request the display (e.g., the display device 160) to operate at a refresh rate in the range of the first frequency (e.g., 60 Hz) to the second frequency (e.g., 120 Hz), under the control of the processor 120, in operation 615.

Figure 7:
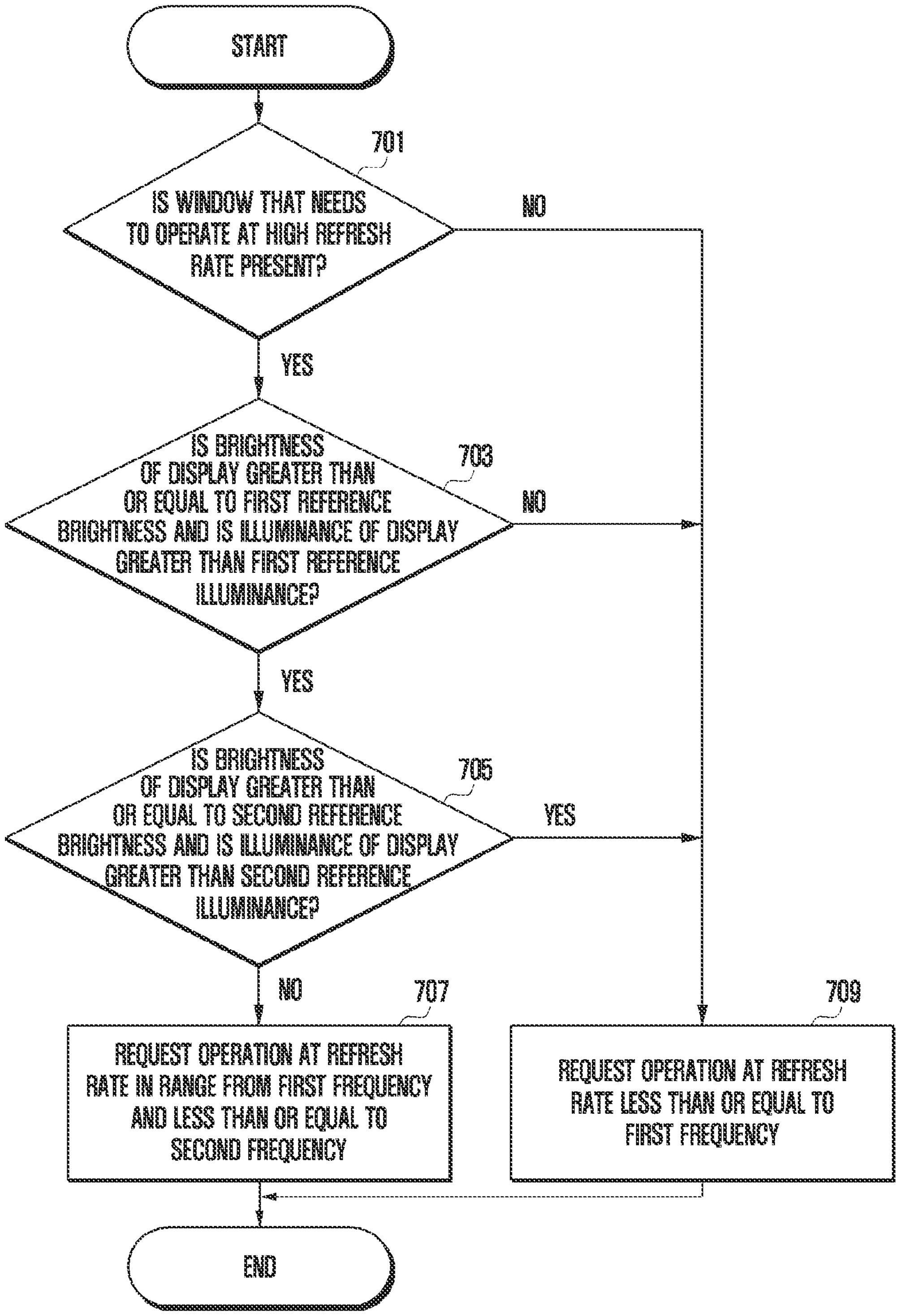
FIG. 7 is a flowchart illustrating an example process of determining a refresh rate based on whether the brightness and/or illuminance of an electronic device falls within a predetermined brightness and/or illuminance range according to various embodiments.

FIG. 7 is a flowchart illustrating an example process of determining a refresh rate based on whether the brightness and/or illuminance of the electronic device 101 falls within a predetermined brightness and/or illuminance range according to various embodiments.

In operation 701, the electronic device 101 may determine whether a window that needs to operate at a high refresh rate is present, under the control of the processor 120.

If it is determined that a window that needs to operate at a high refresh rate is present in operation 701, the electronic device 101 may proceed with operation 703 under the control of the processor 120.

If it is determined that a window that needs to operate at a high refresh rate is not present in operation 701, the electronic device 101 may proceed with operation 709 under the control of the processor 120.

In operation 709, the electronic device 101 may request the display (e.g., the display device 160) to operate at a refresh rate less than or equal to a first frequency (e.g., 60 Hz), under the control of the processor 120.

If a window that needs to operate at a high refresh rate is present, the electronic device 101 may determine whether the brightness of the display (e.g., the display device 160) of the electronic device 101 is greater than or equal to a first reference brightness and the illuminance of the electronic device 101 is greater than or equal to a first reference illuminance, under the control of the processor 120, in operation 703. For example, the first reference brightness may be 98 nit, and the first reference illuminance may be 100 lux.

If it is determined that the brightness of the display (e.g., the display device 160) of the electronic device 101 is greater than or equal to the first reference brightness and the illuminance of the electronic device 101 is greater than or equal to the first reference illuminance in operation 703, the electronic device 101 may proceed with operation 705.

If it is determined that the brightness of the display (e.g., the display device 160) of the electronic device 101 is less than or equal to the first reference brightness and the illuminance of the electronic device 101 is less than or equal to the first reference illuminance in operation 703, the electronic device 101 may proceed with operation 709.

If it is determined that the brightness of the display (e.g., the display device 160) is greater than or equal to the first reference brightness and the illuminance of the electronic device 101 is greater than or equal to the first reference illuminance, the electronic device 101 may determine whether the brightness of the electronic device 101 is greater than or equal to a second brightness and the illuminance of the electronic device 101 is greater than or equal to a second reference illuminance in operation 705. The second reference brightness may be 420 nit, and the second reference illuminance may be 3000 lux.

If it is determined that the brightness is less than or equal to the second reference brightness and the illuminance is less than or equal to the second reference illuminance in operation 705, the electronic device 101 may proceed with operation 707 under the control of the processor 120.

If it is determined that the brightness is greater than or equal to the second reference brightness and the illuminance is greater than or equal to the second reference illuminance in operation 705, the electronic device 101 may proceed with operation 709 under the control of the processor 120.

If it is determined that the brightness is less than or equal to the second reference brightness and the illuminance is less than or equal to the second reference illuminance, the electronic device 101 may request the display (e.g., the display device 160) to operate at a refresh rate in the range of the first frequency (e.g., 60 Hz) to the second frequency (e.g., 120 Hz), under the control of the processor 120, in operation 707.

Figure 8:
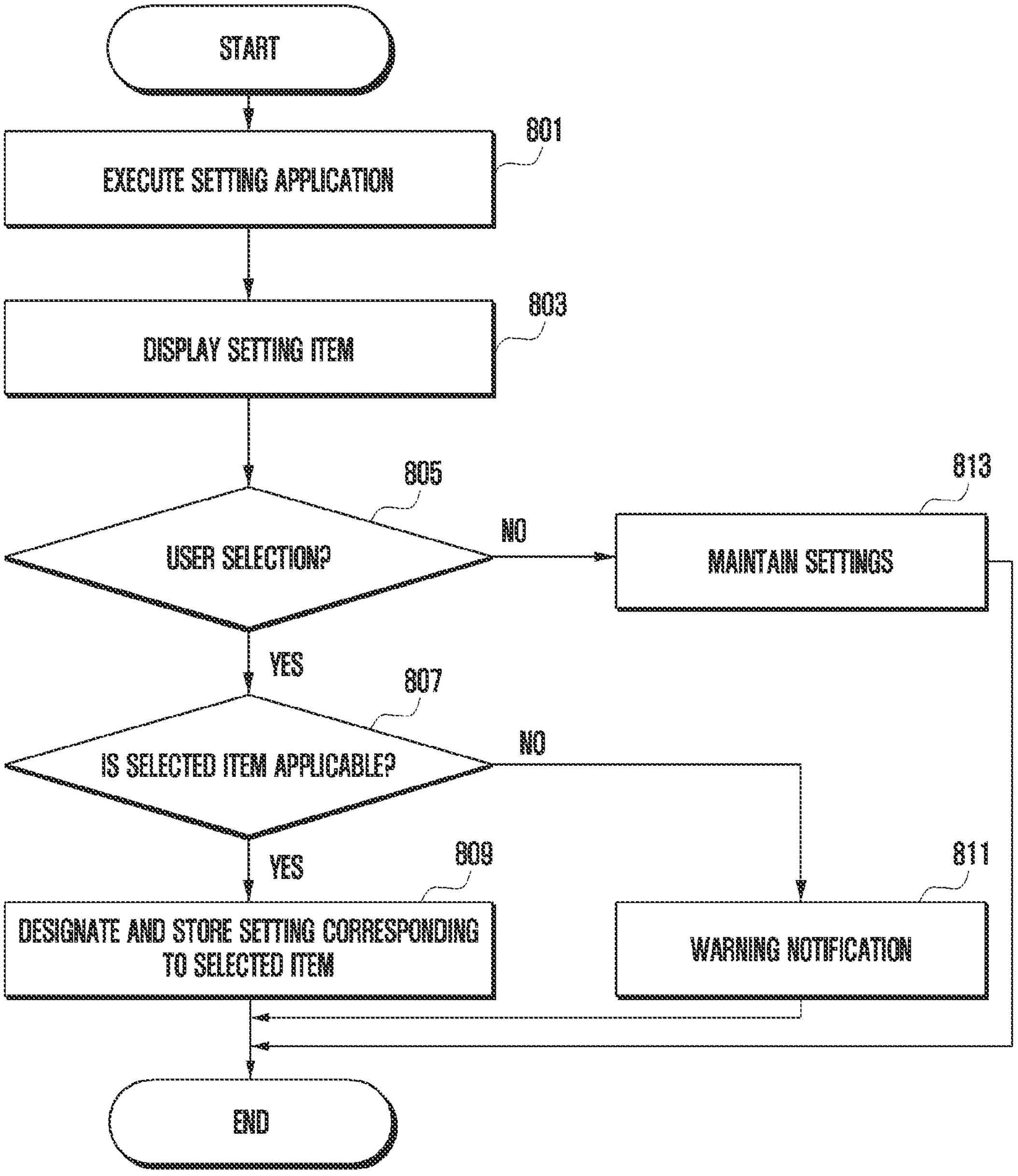
FIG. 8 is a flowchart illustrating an example method of determining a refresh rate using a setting application of an electronic device according to various embodiments.

FIG. 8 is a flowchart illustrating an example process of determining a refresh rate using the setting application 222 by the electronic device 101 according to various embodiments.

In operation 801, the electronic device 101 executes the setting application 222 under the control of the processor 120.

In operation 803, the electronic device 101 may display a setting item when the setting application 222 is executed, under the control of the processor 120. For example, the electronic device 101 may display a setting item associated with a refresh rate when the setting application 222 is executed, under the control of the processor 120.

In operation 805, the electronic device 101 may determine whether a user selection made on the setting item is present, under the control of the processor 120. For example, the electronic device 101 may determine whether a user selection made on the setting item associated with a refresh rate is present, under the control of the processor 120.

If a user selection made on the setting item is present in operation 805, the electronic device 101 may proceed with operation 807, under the control of the processor 120.

If a user selection made on the setting item is not present in operation 805, the electronic device 101 may proceed with operation 813, under the control of the processor 120.

If a user selection on the setting item is not present, the electronic device 101 may maintain settings under the control of the processor 120, in operation 813. For example, the electronic device 101 may maintain the setting associated with a refresh rate, under the control of the processor 120.

If a user selection made on the setting item is present, the electronic device 101 may determine whether the selected setting item is applicable under the control of the processor 120, in operation 807. For example, the electronic device 101 may determine whether the selected item associated with a refresh rate is applicable, under the control of the processor 120.

If it is determined that the selected item associated with a refresh rate is applicable in operation 807, the electronic device 101 may proceed with operation 809 under the control of the processor 120.

If it is determined that the selected item associated with a refresh rate is not applicable in operation 807, the electronic device 101 may proceed with operation 811 under the control of the processor 120.

If the selected item associated with a refresh rate is applicable, the electronic device 101 may designate and store a setting corresponding to the selected item associated with a refresh rate, under the control of the processor 120, in operation 809.

If the selected item associated with a refresh rate is not applicable, the electronic device 101 may provide a warning notification associated with information indicating that the selected item associated with a refresh rate is not applicable, under the control of the processor 120, in operation 811. For example, the warning notification may be displayed as a message.

Figure 9:
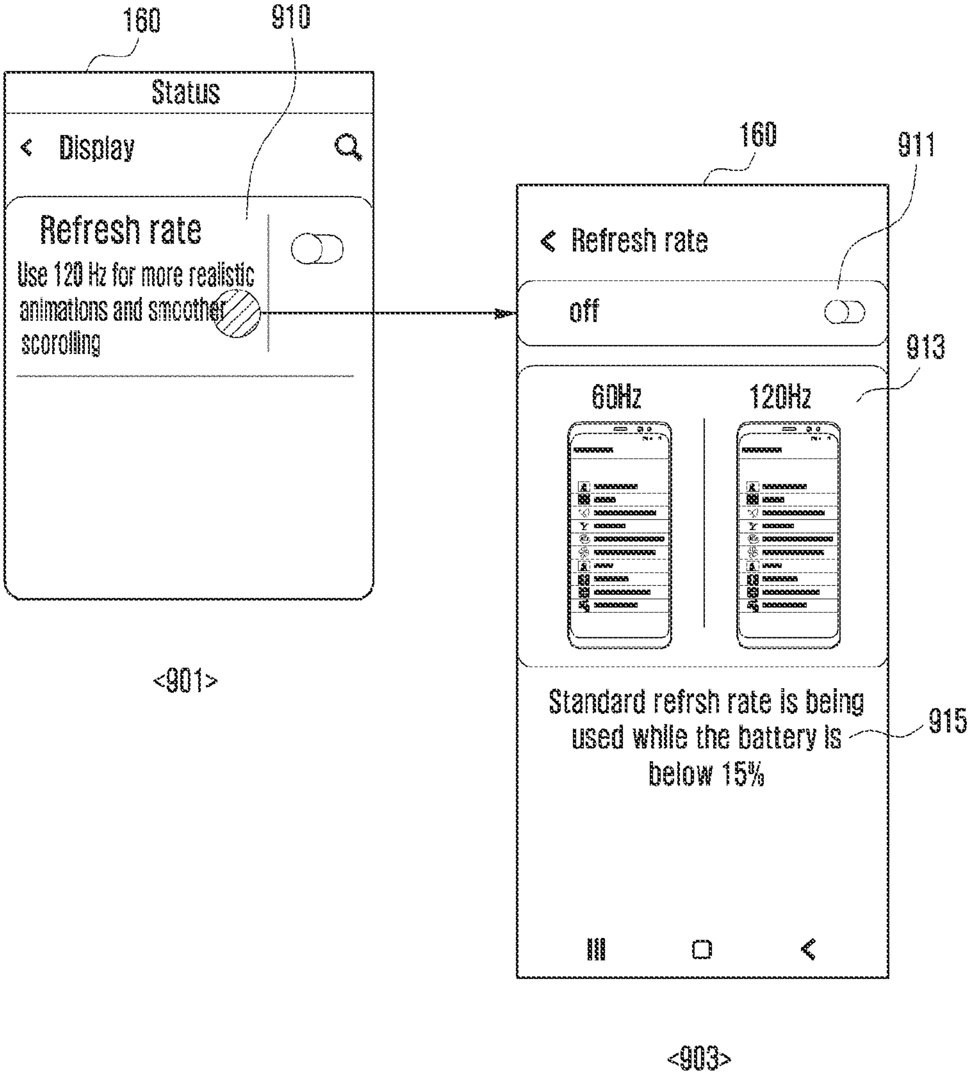
FIG. 9 is a diagram illustrating an example method of performing setting via a setting application of an electronic device according to various embodiments.

FIG. 9 is a diagram illustrating an example method of performing setting via the setting application 222 of the electronic device 101 according to various embodiments.

If the setting application 222 is executed, the electronic device 101 may display an item 910 for setting a refresh rate as a user interface on a display (e.g., the display device 160), as shown in diagram 901. If the refresh rate is changed from "off" to "on" by a user selection, the refresh rate of the display (e.g., the display device 160) may be set to a second frequency (e.g., 120 Hz).

In diagram 901, if the setting application 222 is executed, the electronic device 101 may further include and display a message indicating that the refresh rate of the display (e.g., the display device 160) is capable of being set to the second frequency (e.g., 120 Hz) if the item 910 for setting a refresh rate on the display (e.g., the display 160) is selected.

If a user selects the item 910 for setting a refresh rate displayed on the display (e.g., the display device 160), the electronic device 101 may display a screen as shown in diagram 903.

In diagram 903, the electronic device 101 may display a user interface 911 capable of changing a refresh rate to the second frequency (e.g., 120 Hz), on the display (e.g., the display device 160). If the refresh rate is changed from "off" to "on" by a user selection, the refresh rate of the display (e.g., the display device 160) may be set to the second frequency (e.g., 120 Hz).

In the diagram 903, the electronic device 101 may display, on the display (e.g., the display device 160), a user interface 913 associated with a screen showing display methods for the display (e.g., the display device 160) when a refresh rate is set to the first frequency (e.g., 60 Hz) and the display when a refresh rate is set to the second frequency (e.g., 120 Hz).

In the diagram 903, the electronic device 101 may describe functions, and may display a warning message as a user interface 915 on the display (e.g., the display device 160). The warning message may include, for example, information indicating that the refresh rate may be set to the first frequency (e.g., 60 Hz) if the power of the battery 189 is less than or equal to a predetermined power (e.g., 15%).

Figure 10:
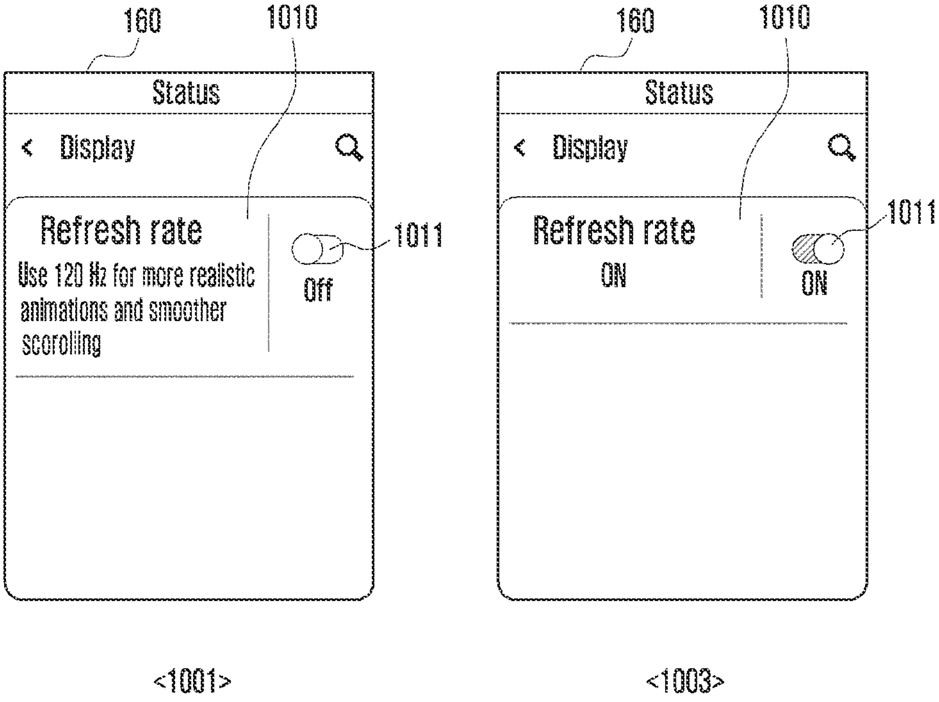
FIG. 10 is a diagram illustrating an example method of performing setting via a setting application of an electronic device according to various embodiments.

FIG. 10 is a diagram illustrating an example method of performing setting via the setting application 222 of the electronic device 101 according to various embodiments.

In diagrams 1001 and 1003, if the setting application 222 is executed, the electronic device 101 may display an item 1010 for setting a refresh rate as a user interface on a display (e.g., the display device 160). A user interface 1011 for selecting "on"/"off" may be displayed on the display (e.g., the display device 160).

In the diagram 1001, if the refresh rate is changed from "on" to "off" by a user selection, the refresh rate of the display (e.g., the display device 160) may be set to a first frequency (e.g., 60 Hz).

In the diagram 1003, if the refresh rate is changed from "off" to "on" by a user selection, the refresh rate of the display (e.g., the display device 160) may be set to a second frequency (e.g., 120 Hz).

Figure 11:
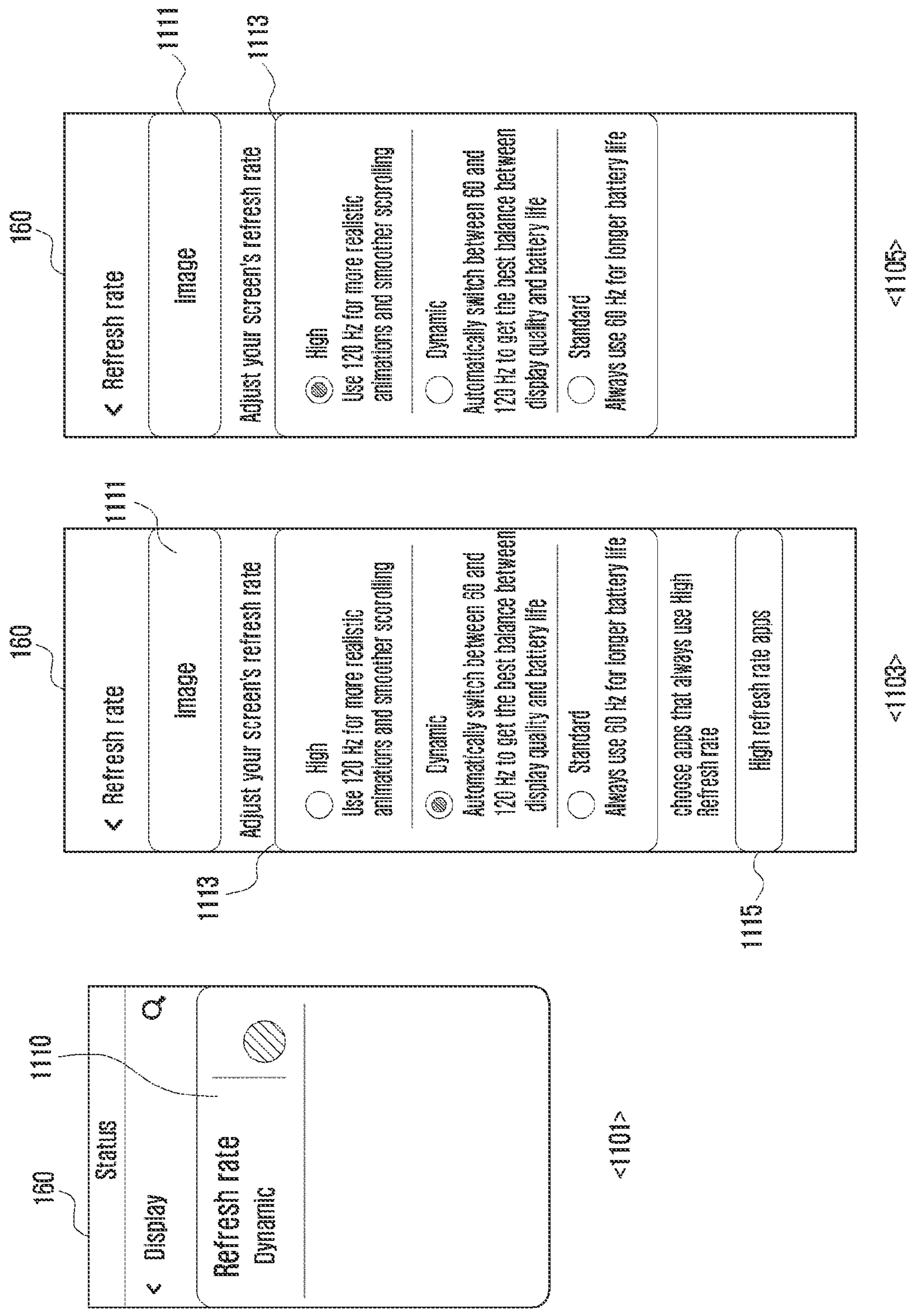
FIG. 11 is a diagram illustrating an example method of performing setting via a setting application of an electronic device according to various embodiments.

FIG. 11 is a diagram illustrating an example method of performing setting via the setting application 222 of the electronic device 101 according to various embodiments.

In diagram 1101, if the setting application 222 is executed, the electronic device 101 may display an item 1110 for setting a refresh rate as a user interface on a display (e.g., the display device 160). If the refresh rate is changed from "off" to "on" by a user selection, the refresh rate of the display (e.g., the display device 160) may be set to a second frequency (e.g., 120 Hz).

In the diagram 1101, if the setting application 222 is executed, the electronic device 101 may further include and display a message indicating that the refresh rate of the display (e.g., the display device 160) is capable of being set to the second frequency (e.g., 120 Hz) if the item 1110 for setting a refresh rate displayed on the display (e.g., the display 160) is selected.

If a user selects the item 1110 for setting a refresh rate displayed on the display (e.g., the display device 160), the electronic device 101 may display a screen as shown in diagram 1103.

In the diagram 1103, if the refresh rate is changed by a user selection made on the display (e.g., the display device 160), the electronic device 101 may display the state of a screen applied according to the selected refresh rate as a preview image 1111. In the diagram 1103, the preview image 1111 may be a preview image of the display (e.g., the display device 160) when an item for operating the display (e.g., the display device 160) at a frequency in the range of the first frequency (e.g., 60 Hz) to the second frequency (e.g., 120 Hz) is selected.

In the diagram 1103, the electronic device 101 may display a refresh rate item 1113 which may be applied by a user selection on the display (e.g., the display device 160). The refresh rate item 1113 may be displayed as a user interface for selecting one item from among an item for operating the display (e.g., the display device 160) at the second frequency (e.g., 120 Hz), an item for operating the display (e.g., the display device 160) at a frequency in the range of the first frequency (e.g., 60 Hz) to the second frequency (e.g., 120 Hz), and an item for operating the display (e.g., the display device 160) at the first frequency (e.g., 60 Hz).

In diagram 1103, the electronic device 101 may display an application list, to which an item for operation at the second frequency (e.g., 120 Hz) is applied, as a notification 1115 on the display (e.g., the display device 160).

If a user selects the item 1110 for setting a refresh rate displayed on the display (e.g., the display device 160), the electronic device 101 may display a screen as shown in diagram 1105.

In diagram 1105, if the refresh rate is changed by a user selection made on the display (e.g., the display device 160), the electronic device 101 may display the state of a screen applied according to the selected refresh rate as the preview image 1111. In the diagram 1105, the preview image 1111 may be a preview image of the display (e.g., the display device 160) when an item for operating the display (e.g., the display device 160) at the second frequency (e.g., 120 Hz) is selected.

In the diagram 1105, the electronic device 101 may display the refresh rate item 1113 which may be applied by a user selection on the display (e.g., the display device 160). The refresh rate item 1113 may be displayed as a user interface for selecting one item from among an item for operating the display (e.g., the display device 160) at the second frequency (e.g., 120 Hz), an item for operating the display (e.g., the display device 160) at a frequency in the range of the first frequency (e.g., 60 Hz) to the second frequency (e.g., 120 Hz), and an item for operating the display (e.g., the display device 160) at the first frequency (e.g., 60 Hz).

Figure 12:
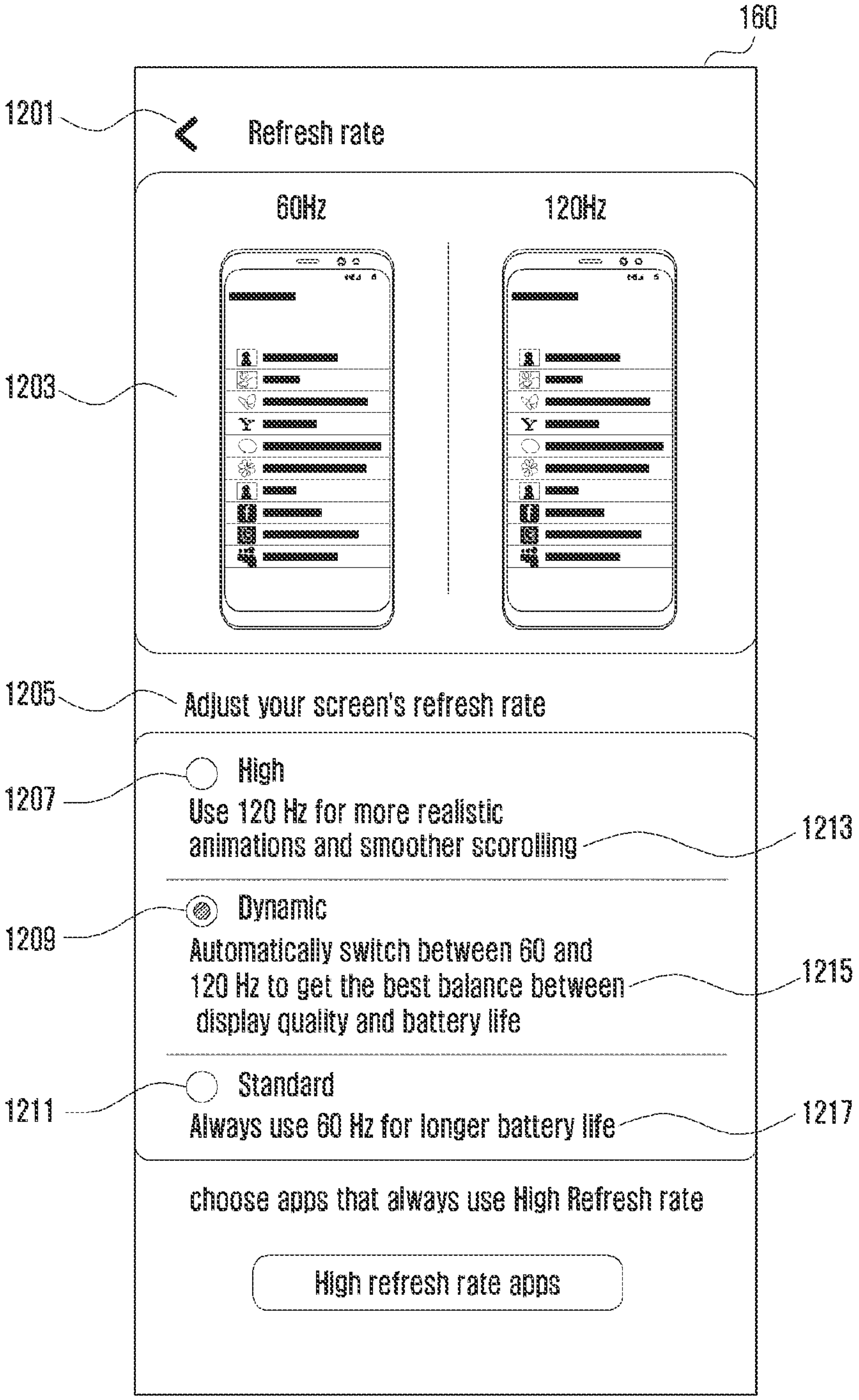
FIG. 12 is a diagram illustrating an example method of performing setting via a setting application of an electronic device according to various embodiments.

FIG. 12 is a diagram illustrating an example method of performing setting via the setting application 222 of the electronic device 101 according to various embodiments.

The electronic device 101 may include a user interface for changing a setting associated with a refresh rate in the display (e.g., the display device 160).

The user interface may include an indicator 1201 indicating a setting associated with a refresh rate, a preview image 1203 associated with the state of a screen applied based on a selected refresh rate if a refresh rate is changed by a user selection, a message 1205 indicating that a refresh rate is selectable, an indicator 1207 indicating an item for operating a display (e.g., the display device 160) at a second frequency (e.g., 120 Hz), an indicator 1209 indicating an item for operating the display (e.g., the display device 160) at a frequency in the range of a first frequency (e.g., 60 Hz) to the second frequency (e.g., 120 Hz), an indicator 1211 indicating an item for operating the display (e.g., the display device 160) at the first frequency (e.g., 60 Hz), a message 1213 associated with an item for operating the display (e.g., the display device 160) at the second frequency (e.g., 120 Hz), a message 1215 associated with an item for operating the display (e.g., the display device 160) at a frequency in the range of the first frequency (e.g., 60 Hz) to the second frequency (e.g., 120 Hz), and/or a message 1217 associated with an item for operating the display (e.g., the display device 160) at the second frequency (e.g., 120 Hz).

Figure 13:
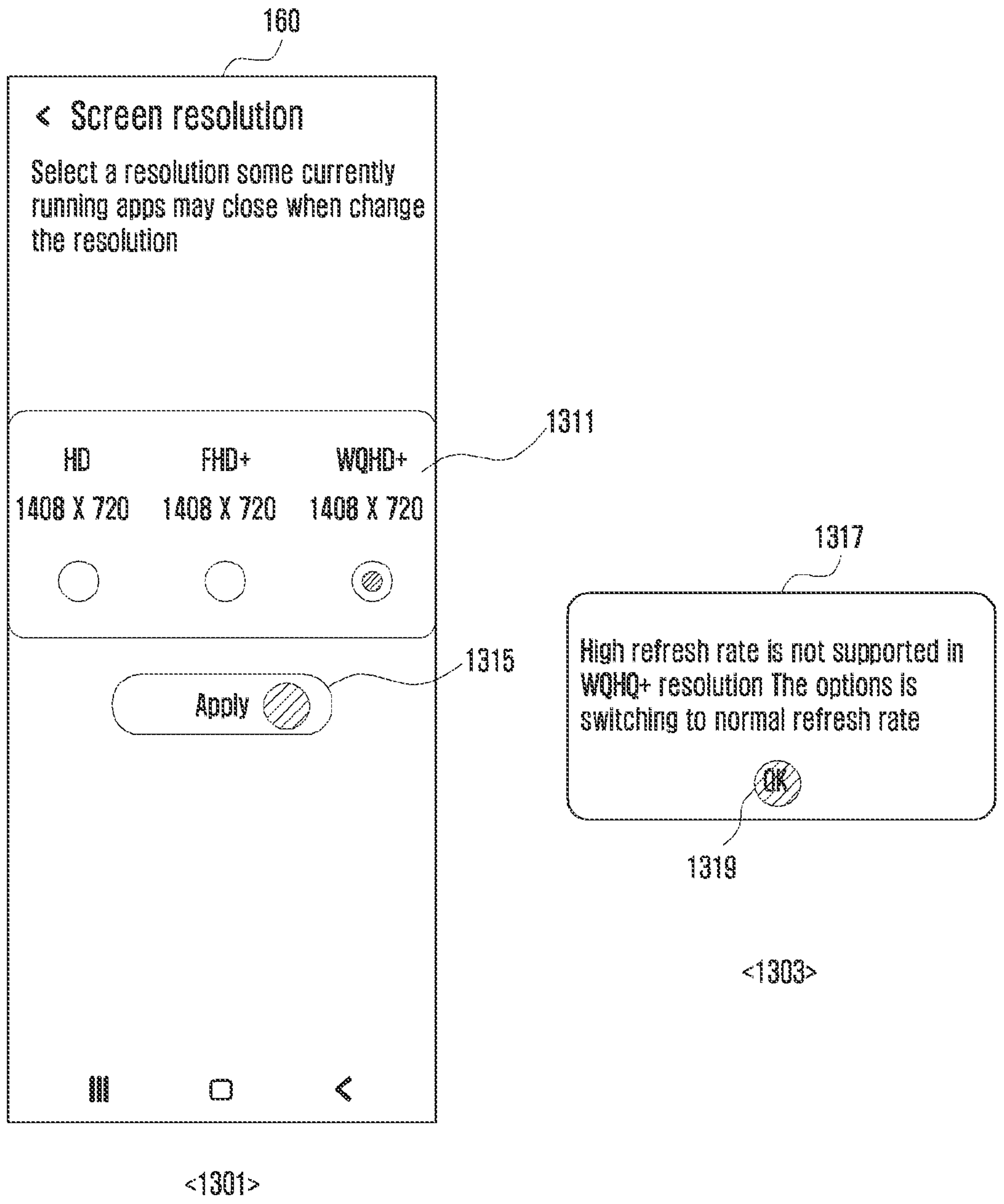
FIG. 13 is a diagram illustrating an example method of performing setting via a setting application of an electronic device according to various embodiments.

FIG. 13 is a diagram illustrating an example method of performing setting via the setting application 222 of the electronic device 101 according to various embodiments.

In diagram 1301, if the setting application 222 is executed, the electronic device 101 may display an item 1311 for setting a resolution on a display (e.g., the display device 160), and may display an item 1315 for selecting whether to apply a selected resolution. The item 1311 for setting a resolution may include, for example, items for selecting HD, FHD, or WQHD.

If an item 1315 for selecting whether to apply a selected resolution is selected by a user input, the electronic device 101 may display a message indicating that a refresh rate may be limited when a refresh rate is changed, via a popup 1317, and may display a user confirm interface 1319 as shown in diagram 1303. For example, if the resolution is set to WQHD, information indicating that a refresh rate may be determined within the range lower than or equal to the first frequency (e.g., 60 Hz) may be displayed via the popup 1317.

Figure 14:
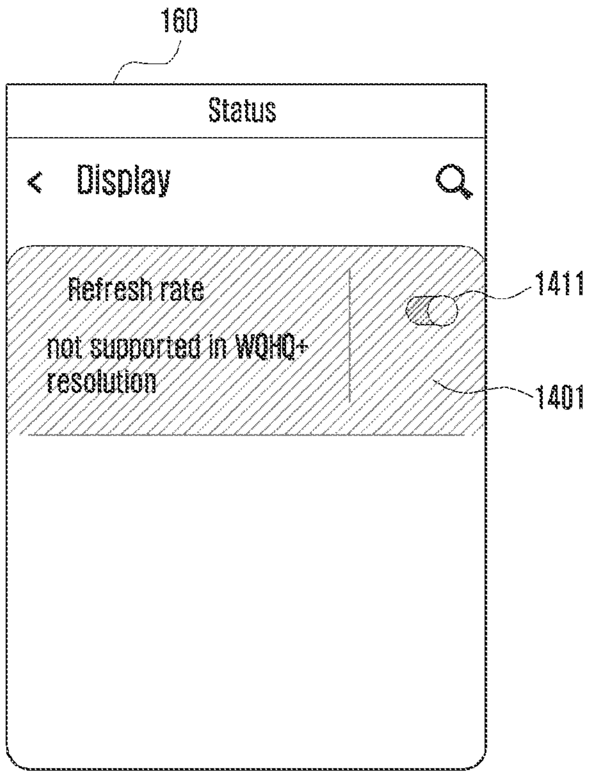
FIG. 14 is a diagram illustrating an example method of performing setting via a setting application of an electronic device according to various embodiments.

FIG. 14 is a diagram illustrating an example method of performing setting via the setting application 222 of the electronic device 101 according to various embodiments.

If a user selects a resolution that does not support a refresh rate of the range of a second frequency (e.g., 120 Hz), the electronic device 101 may process an item 1401 for setting a refresh rate displayed on a display (e.g., the display device 160) to be dark even though a user selects the display (e.g., the display device 160) to operate at the refresh rate of the range of the second frequency (e.g., 120 Hz), for example, selects "on" 1411, and the electronic device 101 may display a message indicating that the resolution selected by the user does not support the refresh rate of the range of the second frequency (e.g., 120 Hz).

Figure 15A:
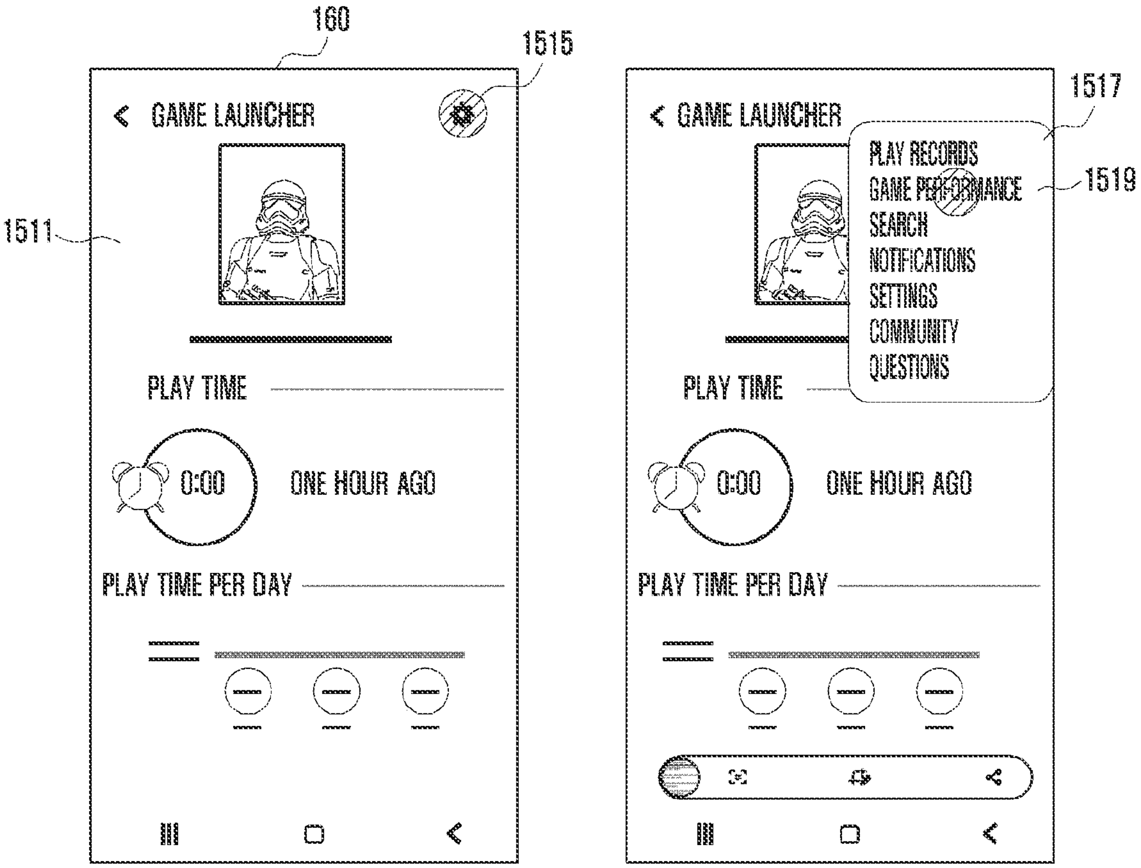
FIG. 15A is a diagram illustrating an example method of performing setting via a setting application of an electronic device according to various embodiments.
Figure 15A:
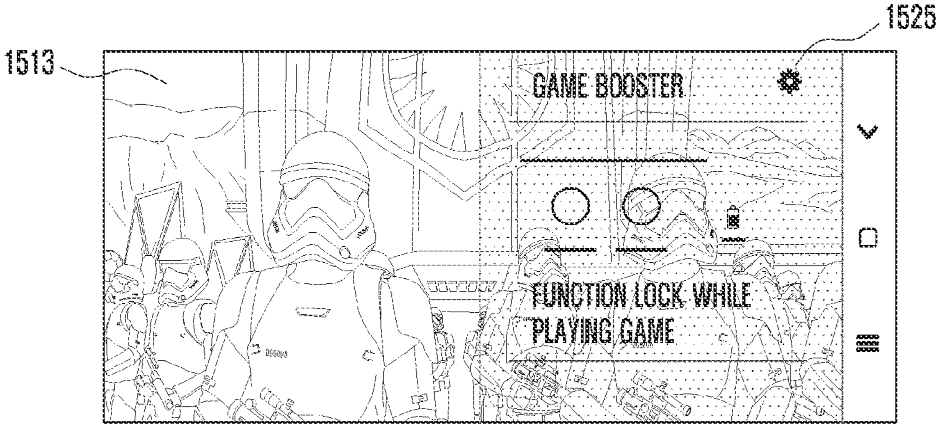
Figure 15B:
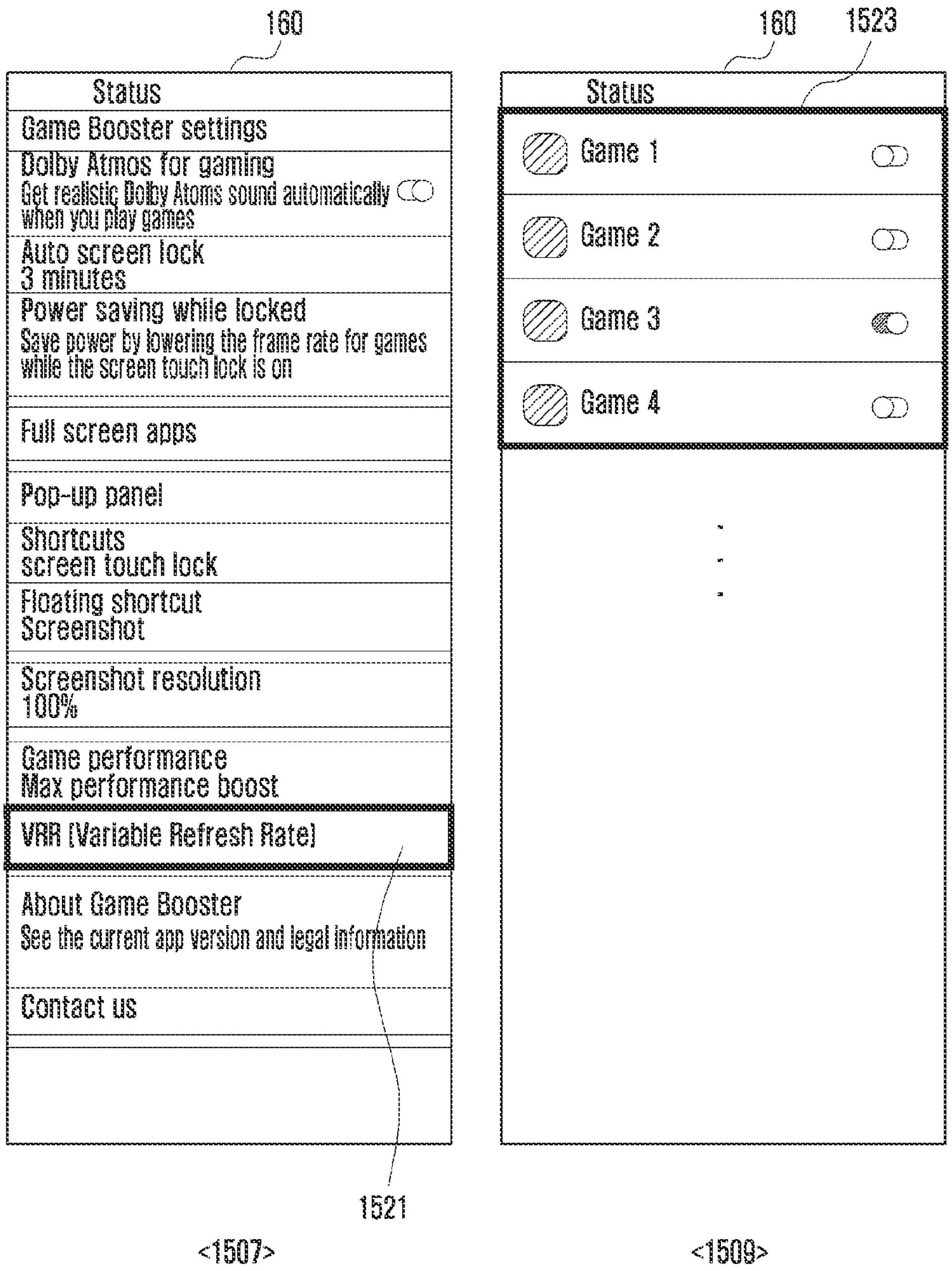
FIG. 15B is a diagram illustrating an example method of performing setting via a setting application of an electronic device according to various embodiments.

FIG. 15A is a diagram illustrating an example method of performing setting via the setting application 222 of the electronic device 101 according to various embodiments, and FIG. 15B is a diagram illustrating an example method of performing setting via the setting application 222 of the electronic device 101 according to various embodiments.

In diagram 1501, the electronic device 101 may install a game application, and may display a launcher screen 1511 of the installed game application on a display (e.g., the display device 160). A user may enable display of a user interface 1515 associated with game settings in the game application launcher screen 1511. If the user interface 1515 associated with game settings is selected by a user selection, the electronic device 101 may change the screen of diagram 1501 to the screen of diagram 1503 and may display the same on the display (e.g., the display device 160).

In diagram 1503, if the user interface 1515 associated with game settings is selected by a user selection made on the display (e.g., the display device 160), the electronic device 101 may display a popup 1517 associated with setting items including an item 1519 for setting a game performance.

In diagram 1505, the electronic device 101 may execute the game application, and may display an execution screen 1513 of the game application on the display (e.g., the display device 160). The electronic device 101 may display a user interface 1525 for setting a game performance on the execution screen 1513 of the game application.

If the item 1519 for setting a game performance is selected in the diagram 1503, or if the user interface for setting a game performance displayed on the execution screen 1513 of the game application in diagram 1505, the electronic device 101 may display, on the display (e.g., the display device 160), a screen as shown in diagram 1507.

Referring to FIG. 15B, in diagram 1507, the electronic device 101 may display a game booster setting interface associated with setting of a game performance on the display (e.g., the display device 160). In the diagram 1507, the electronic device 101 may display an item 1521 (e.g., a variable refresh rate (VRR)) associated with setting of a refresh rate on the game booster setting interface.

If the item 1521 associated with setting of a refresh rate is selected, the electronic device 101 may display, on the display (e.g., the display device 160), a screen as shown in diagram 1509.

In the diagram 1509, the electronic device 101 may display items 1523 for setting a refresh rate to a second frequency (e.g., 120 Hz) for each game, on the display (e.g., the display device 160).

Figure 16:
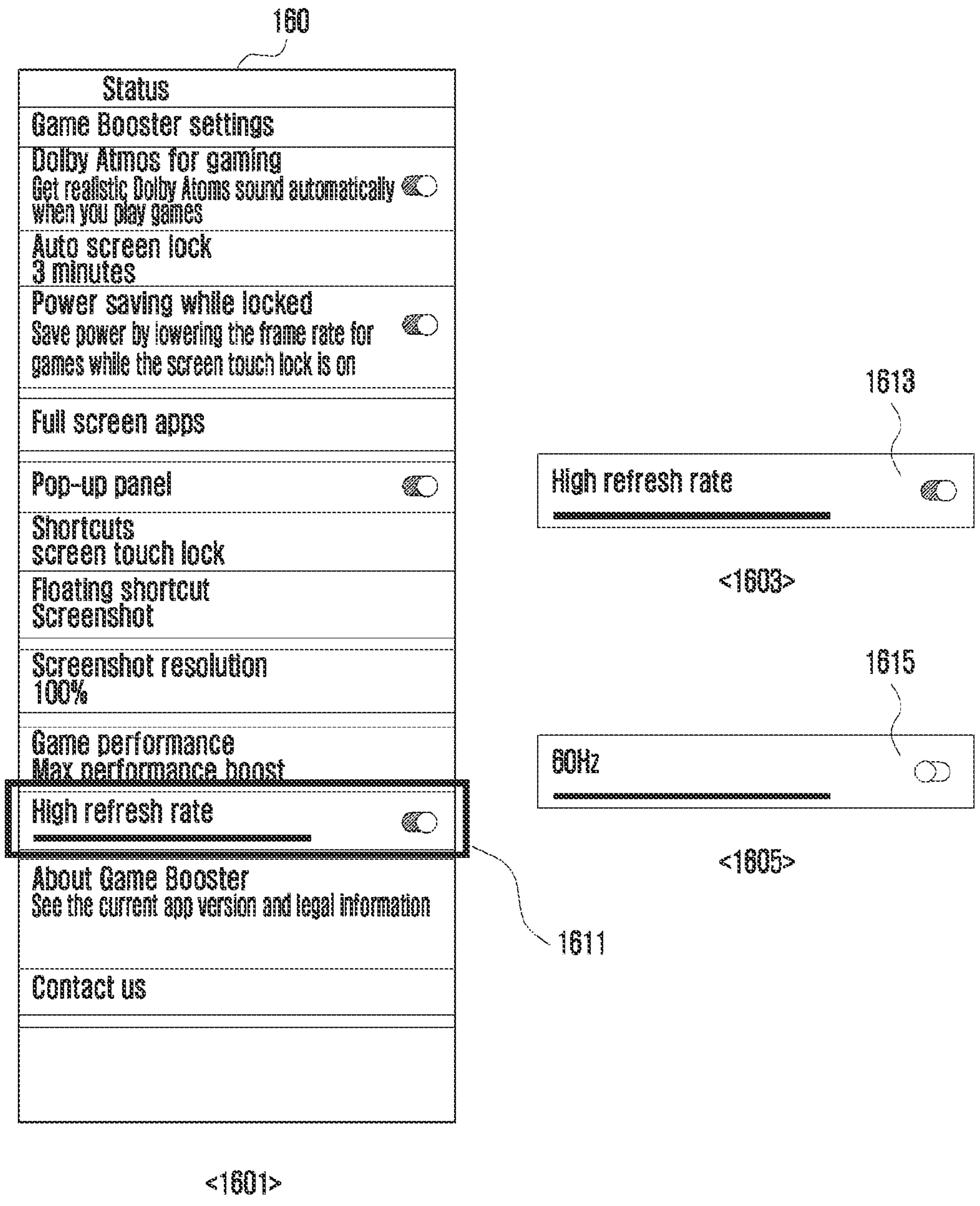
FIG. 16 is a diagram illustrating an example method of performing setting via a setting application of an electronic device according to various embodiments.

FIG. 16 is a diagram illustrating an example method of performing setting via the setting application 222 of the electronic device 101 according to various embodiments.

In diagram 1601, the electronic device 101 may display a game booster setting interface associated with setting of a game performance on the display (e.g., the display device 160).

In diagram 1601, the electronic device 101 may display an item 1611 associated with setting of a refresh rate on the game booster setting interface.

Diagram 1603 illustrates the case in which the item 1611 associated with setting of a refresh rate is set to "on". If the item 1611 associated with setting of a refresh rate is changed to "on" 1613, the electronic device 101 may control the display (e.g., the display device 160) at a refresh rate of a second frequency (e.g., 120 Hz).

Diagram 1605 illustrates the case in which the item 1611 associated with setting of a refresh rate is set to "off". If the item 1611 associated with setting of a refresh rate is changed to "off" as shown in item 1615, the electronic device 101 may control the display (e.g., the display device 160) at a refresh rate of a first frequency (e.g., 60 Hz).

Figure 17:
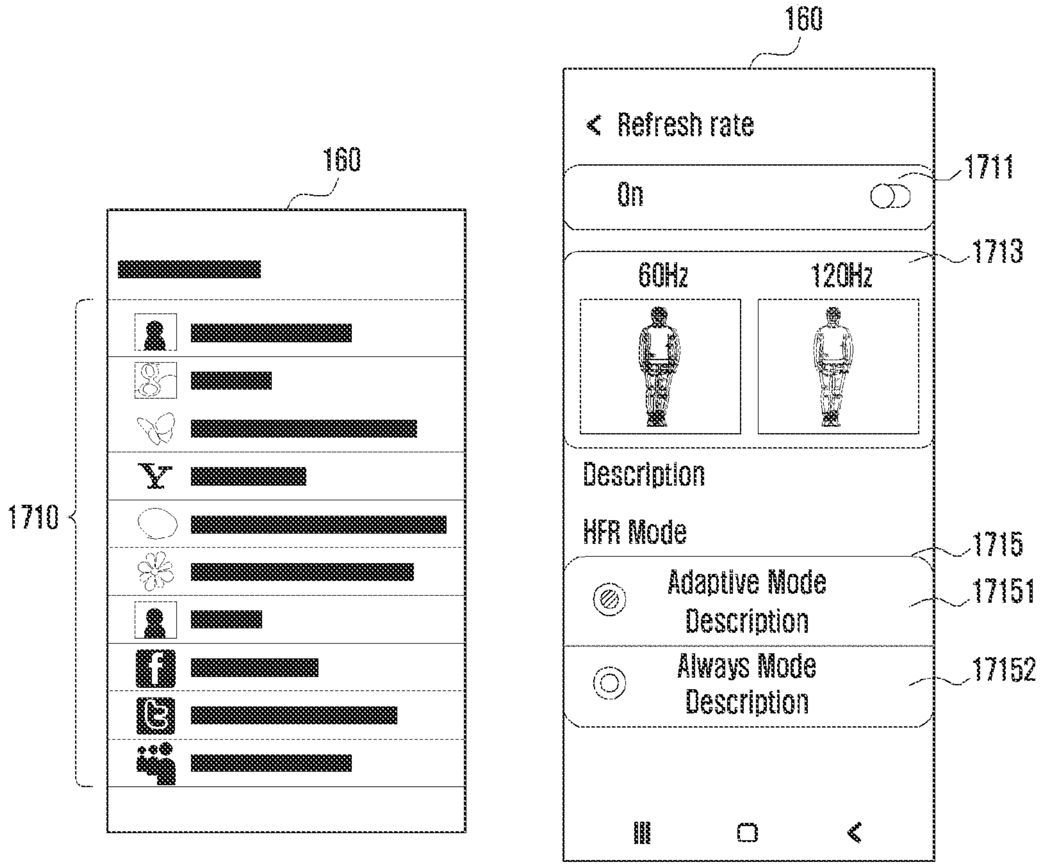
FIG. 17 is a diagram illustrating an example method of performing setting via a setting application of an electronic device according to various embodiments.

FIG. 17 is a diagram illustrating an example method of performing setting via the setting application 222 of the electronic device 101 according to various embodiments.

In diagram 1701, if setting application 222 is executed, the electronic device 101 may display an application list 1710 on a display (e.g., the display device 160).

If an application is selected from the application list 1710, the electronic device 101 may display a screen as shown in diagram 1703. If an application is selected from the application list 1710, the refresh rate of the selected application may be changed.

In diagram 1703, if the refresh rate is changed by a user selection made on the display (e.g., the display device 160), the electronic device 101 may display an item 1711 for setting a refresh rate and a preview image 1713 associated with the state of a screen applied based on the selected refresh rate on the display (e.g., the display device 160).

In the diagram 1703, the preview image 1713 may be a preview image of the display (e.g., the display device 160) which corresponds to an item for operating the display (e.g., the display device 160) at the selected frequency.

In diagram 1703, the electronic device 101 may display a refresh rate item 1715, which may be applied by a user selection, on the display (e.g., the display device 160). The refresh rate item 1715 may be displayed as a user interface for selecting one item from among an item 17152 for operating the display (e.g., the display device 160) at the second frequency (e.g., 120 Hz) and an item 17151 for operating the display (e.g., the display device 160) at a frequency in the range of the first frequency (e.g., 60 Hz) to the second frequency (e.g., 120 Hz).

Figure 18A:
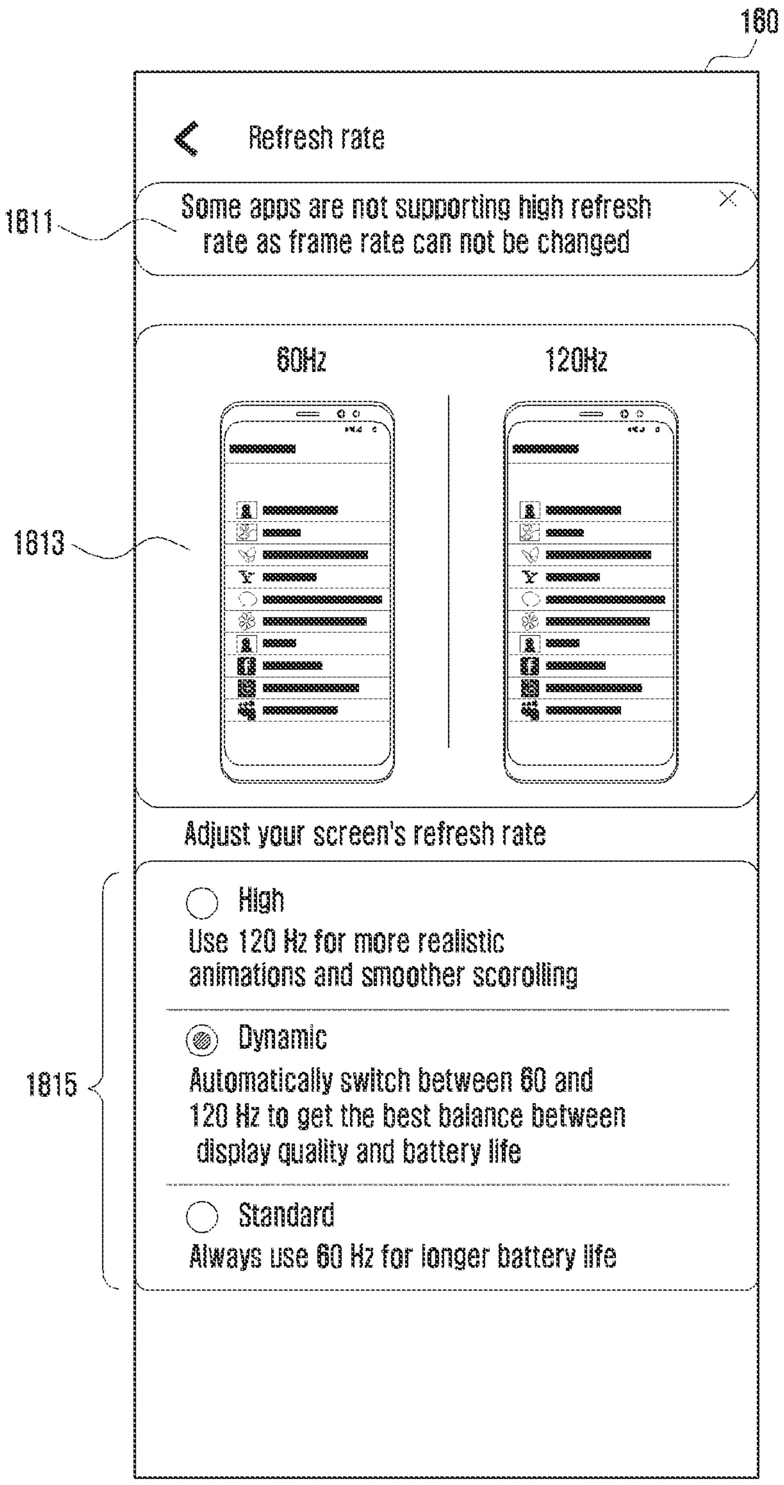
FIG. 18A is a diagram illustrating an example method of performing setting via a setting application of an electronic device according to various embodiments.
Figure 18B:
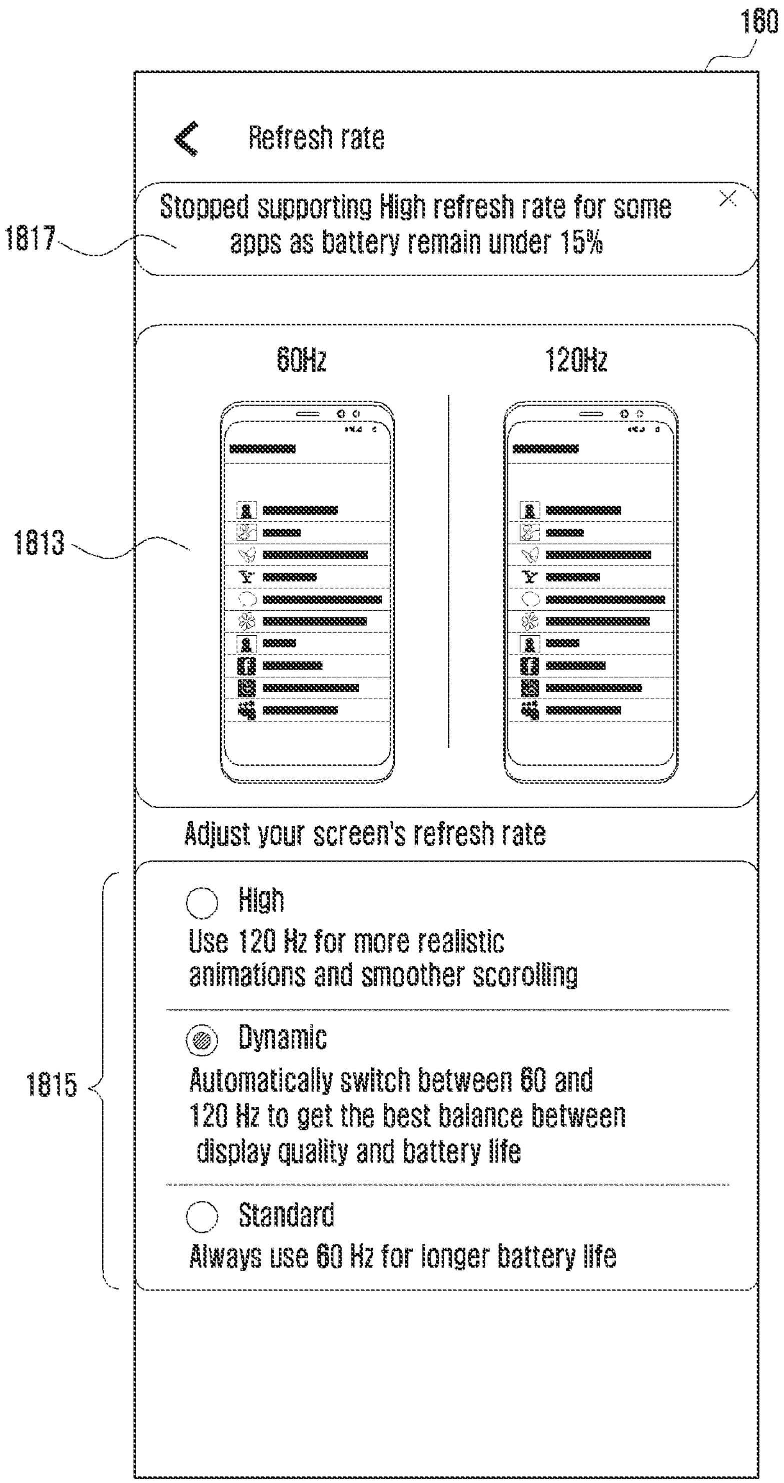
FIG. 18B is a diagram illustrating an example method of performing setting via a setting application of an electronic device according to various embodiments.

FIG. 18A is a diagram illustrating an example method of performing setting via the setting application 222 of the electronic device 101 according to various embodiments, and FIG. 18B is a diagram illustrating an example method of performing setting via the setting application 222 of the electronic device 101 according to various embodiments.

In diagram 1801, the electronic device 101 may display, on a display (e.g., the display device 160), an item 1815 associated with operation of a refresh rate selectable by a user, a preview image 1813 to which a selected refresh rate is applied, and a message 1811 indicating that the selected refresh rate is not applicable to a predetermined application.

In diagram 1803, the electronic device 101 may display, on the display (e.g., the display device 160), an item 1815 associated with operation of a refresh rate selectable by a user, a preview image 1813 to which the selected refresh rate is applied, and a message 1817 indicating that a refresh rate of a second frequency (e.g., 120 Hz) is not operable if the power of the battery 189 is less than or equal to a predetermined power (e.g., 15%).

Figure 19:
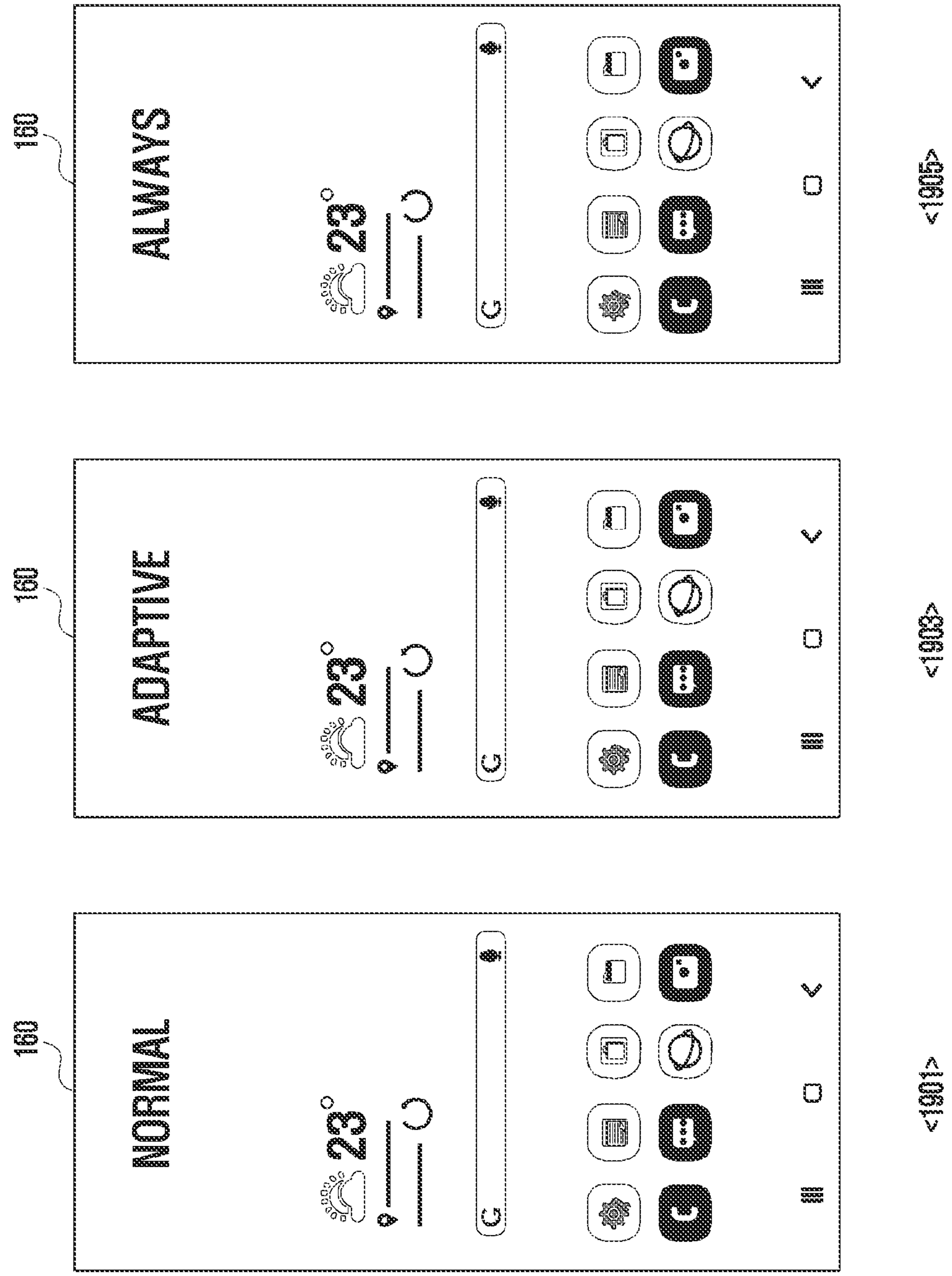
FIG. 19 is a diagram illustrating an example display to which the refresh rate of an electronic device is applied according to various embodiments.

FIG. 19 is a diagram illustrating an example display (e.g., the display device 160) to which the refresh rate of the electronic device 101 is applied according to various embodiments.

Diagram 1901 illustrates the display (e.g., the display device 160) of the electronic device 101 when the display (e.g., the display device 160) is set to operate at a first frequency (e.g., 60 Hz) via the setting application 222.

Diagram 1903 illustrates the display (e.g., the display device 160) of the electronic device 101 when the display (e.g., the display device 160) is set to operate at a frequency in the range of the first frequency (e.g., 60 Hz) to a second frequency (e.g., 120 Hz) via the setting application 222.

Diagram 1905 illustrates the display (e.g., the display device 160) of the electronic device 101 when the display (e.g., the display device 160) is set to operate at the second frequency (e.g., 120 Hz) via the setting application 222.

Figure 20:
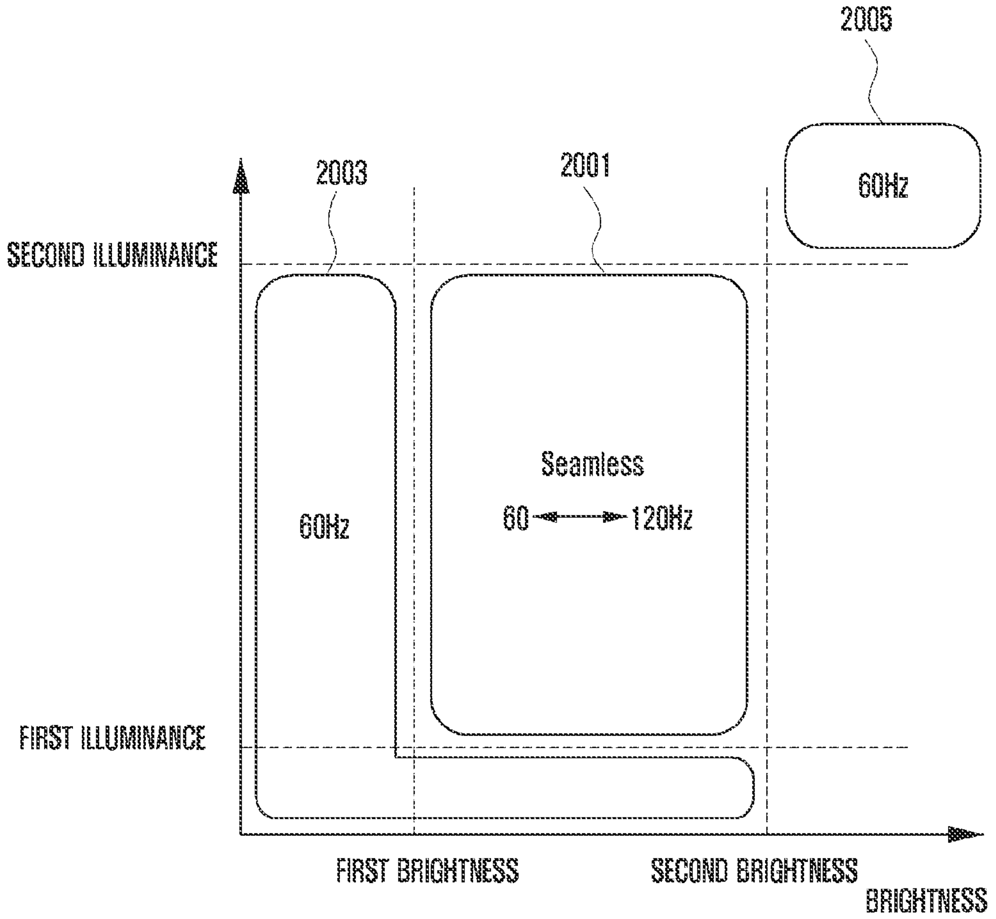
FIG. 20 is a diagram illustrating an example refresh rate based on the illuminance and/or brightness of an electronic device according to various embodiments.

FIG. 20 is a diagram illustrating an example refresh rate based on the illuminance and/or brightness of the electronic device 101 according to various embodiments.

If it is determined that the brightness and/or illuminance of the electronic device 101 is beyond a predetermined brightness and/or illuminance range, the electronic device 101 may determine a refresh rate to be a first frequency (e.g., 60 Hz) under the control of the processor 120.

If it is determined that the brightness and/or illuminance of the electronic device 101 falls within the predetermined brightness and/or illuminance range, the electronic device 101 may determine a refresh rate in the range 2001 of the first frequency (e.g., 60 Hz) to the second frequency (e.g., 120 Hz) under the control of the processor 120.

The predetermined brightness range may be, for example, the range of 98 nit (a first brightness) to 420 nit (a second brightness). The predetermined illuminance range may be, for example, the range of 100 lux (a first illuminance) to 3000 lux (a second illuminance). If it is determined that the brightness and/or illuminance of the electronic device 101 is beyond the predetermined brightness and/or illuminance range, the electronic device 101 may determine a refresh rate in the range 2003 or 2005 less than or equal to the first frequency (e.g., 60 Hz) under the control of the processor 120.

Figure 21:
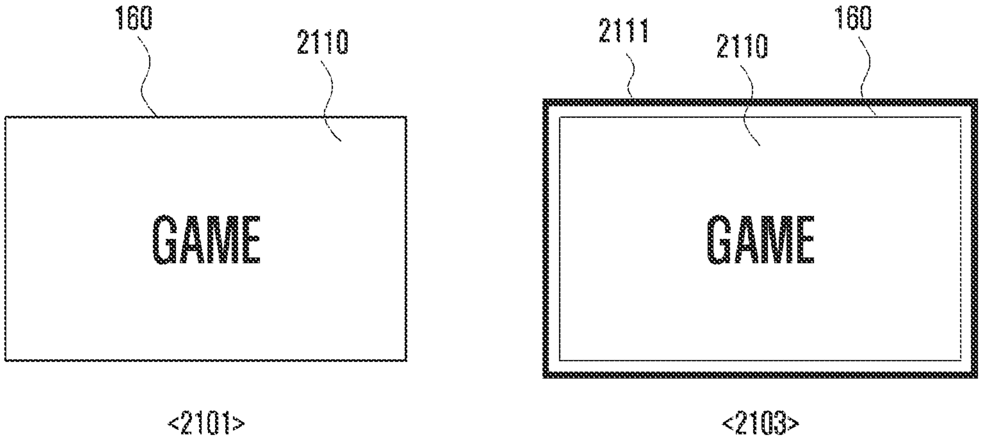
FIG. 21 is a diagram illustrating an example user interface of an application which is being executed when a refresh rate is changed according to various embodiments.

FIG. 21 is a diagram illustrating an example user interface of an application which is being executed when a refresh rate is changed according to various embodiments.

In diagram 2101, the electronic device 101 may display a user interface 2110 of an application that is being executed, on a display (e.g., the display device 160).

In diagram 2103, if the refresh rate of the application that is being executed is changed, the electronic device 101 may display the user interface 2110 of the application that is being executed and a user interface 2111 indicating that a refresh rate has been changed, on the display (e.g., the display device 160).

Figure 22:
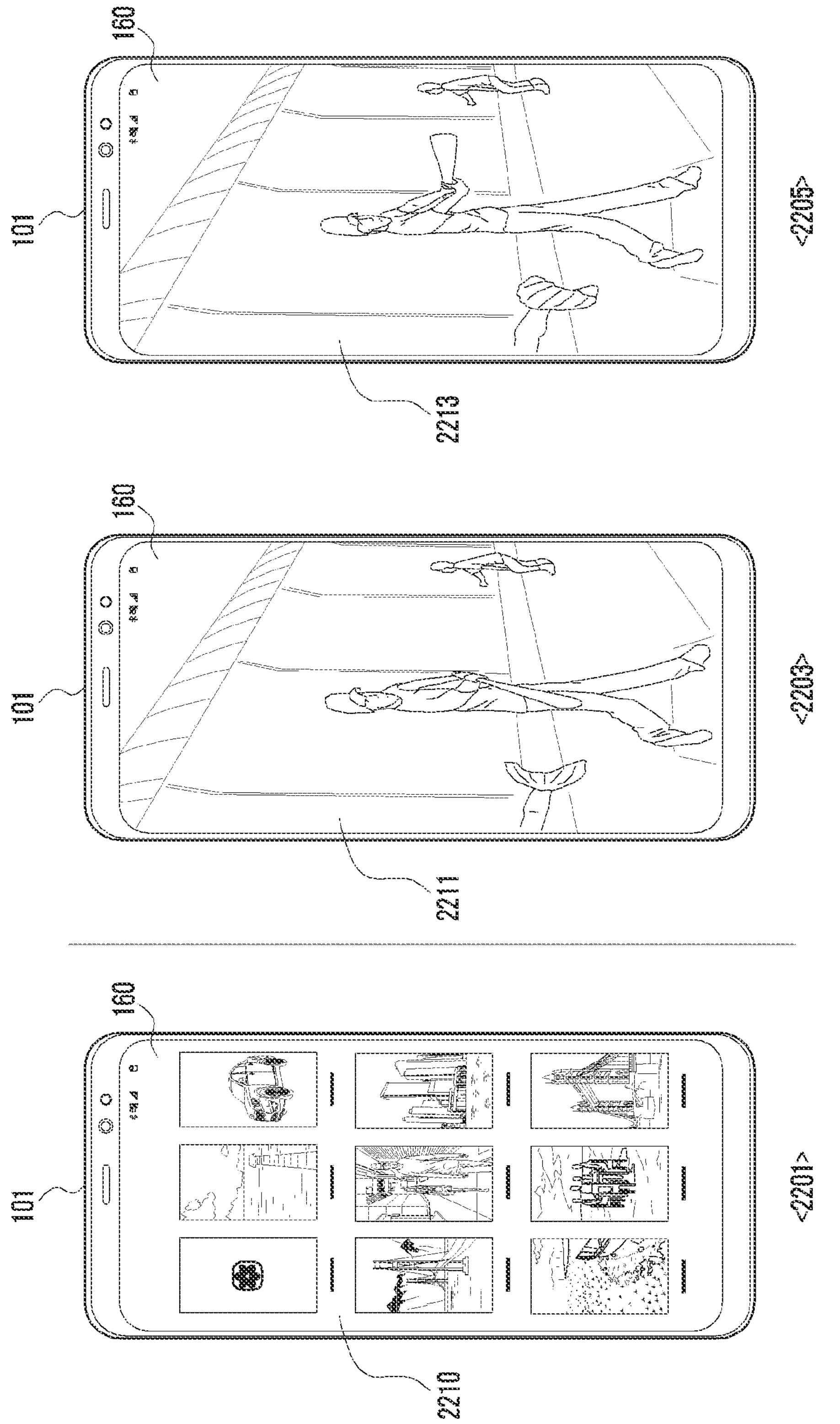
FIG. 22 is a diagram illustrating an example user interface of a video wallpaper when a refresh rate is changed according to various embodiments.

FIG. 22 is a diagram illustrating an example user interface of a video wallpaper when a refresh rate is changed according to various embodiments.

In diagram 2201, the electronic device 101 may display video wallpaper images 2210 applicable to a lock screen and/or home screen on a display (e.g., the display device 160).

In diagram 2203, the electronic device 101 may display a video wallpaper 2211 to which a first frequency (e.g., 60 Hz) is applied, on the display (e.g., the display device 160).

In diagram 2205, the electronic device 101 may display a video wallpaper 2313 to which a second frequency (e.g., 120 Hz) is applied, on the display (e.g., the display device 160).

Figure 23:
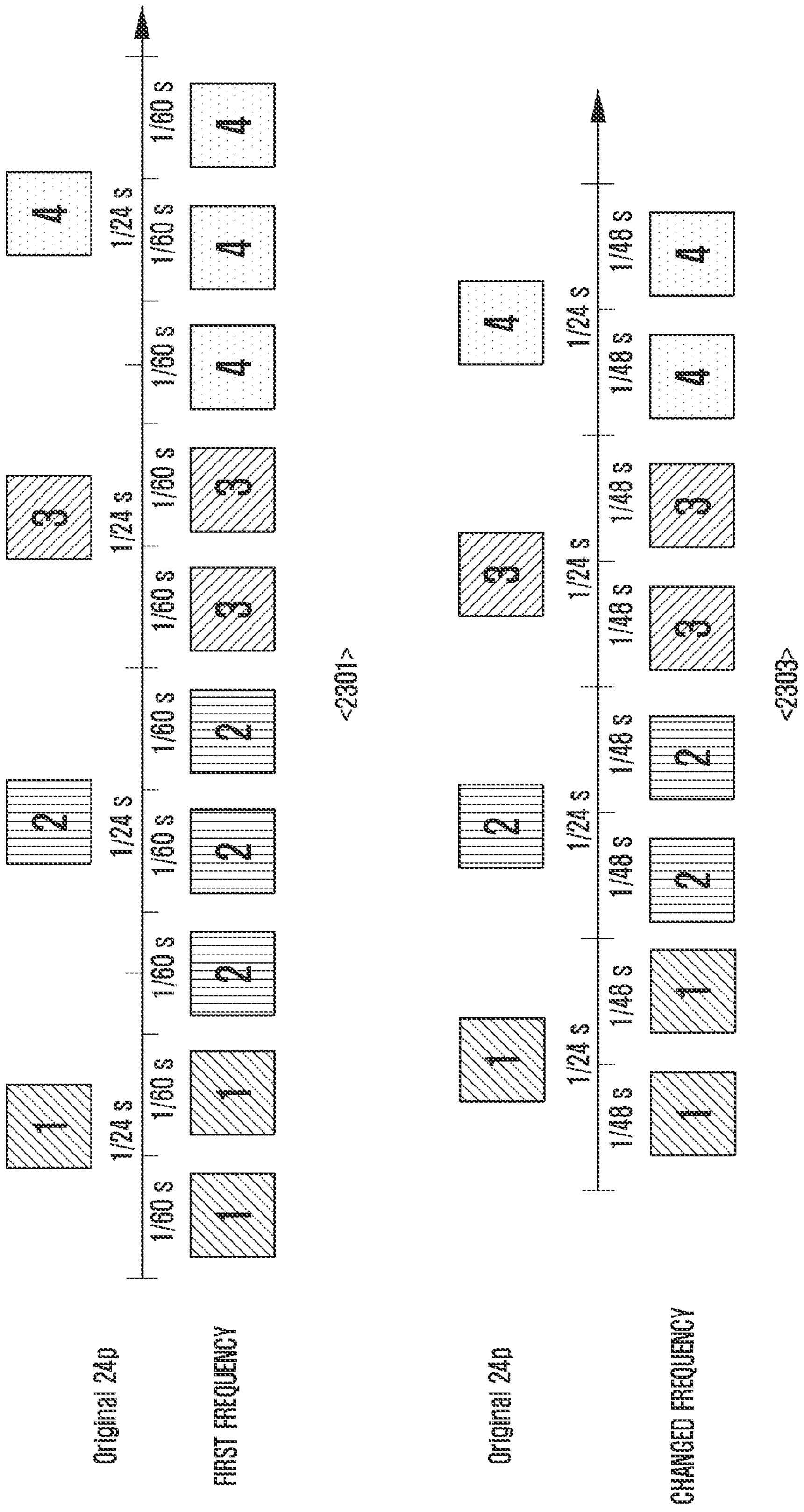
FIG. 23 is a diagram illustrating example improvement of motion disconnection when an application requests operation at a refresh rate of a fixed frequency less than or equal to a first frequency according to various embodiments.

FIG. 23 is a diagram illustrating example improvement of motion disconnection when an application requests operation at a refresh rate of a fixed frequency less than or equal to a first frequency (e.g., 60 Hz) according to various embodiments.

In diagram 2301, if the electronic device 101 displays an image on a display (e.g., the display device 160), screen disconnection (e.g., judder) may occur due to a disagreement between the frame rate of the image and the refresh rate of the display (e.g., the display device 160). In diagram 2301, frames marked with 2 and 4 may correspond to the screen disconnection.

In operation 2303, if an application displays an image at a refresh rate (e.g., 48 Hz) of a fixed frequency less than or equal to the first frequency (e.g., 60 Hz) on the display (e.g., the display device 160), screen disconnection (judder) may be removed and/or reduced.

The electronic device according to various embodiments may be one of various types of electronic devices. The electronic devices may include, for example, a portable communication device (e.g., a smart phone), a computer device, a portable multimedia device, a portable medical device, a camera, a wearable device, a home appliance, or the like. The electronic device according to embodiments of the disclosure is not limited to those described above.

It should be appreciated that various example embodiments of the disclosure and the terms used therein are not intended to limit the technological features set forth herein to particular embodiments and include various changes, equivalents, and/or alternatives for a corresponding embodiment. With regard to the description of the drawings, similar reference numerals may be used to designate similar or relevant elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by one skilled in the art that various changes in form and detail may be made without departing from the true spirit and full scope of the disclosure, including the appended claims and their equivalents.

What is claimed is:

1. An electronic device comprising:

a display configured to display a screen;

a sensor to detect an illuminance of an ambient environment of the electronic device;

a processor including processing circuitry and operatively connected to the display and to the sensor; and memory storing instructions that, when executed by the processor, cause the electronic device to:

control the display to display an execution screen for an application;

determine whether the execution screen corresponds to a screen of a scene transition operation; and control the display to operate at a refresh rate of the display in a first frequency to a second frequency higher than the first frequency, based on a determination that the execution screen corresponds to the screen of the scene transition operation;

after the refresh rate of the display is changed from the first frequency to the second frequency, control the display to display a first frame of a screen as a black frame at the refresh rate of the display in the second frequency to reduce flicker of the display; and control the display to operate at the refresh rate less than or equal to the first frequency when the illuminance of the ambient environment of the electronic device is less than or equal to a predetermined illuminance.

2. The electronic device of claim 1, wherein the instructions cause, when executed by the processor, the electronic device to control the display to operate at the refresh rate of the display less than or equal to the second frequency based on a determination that the execution screen corresponds to the screen of the scene transition operation.

3. The electronic device of claim 1, wherein the instructions cause, when executed by the processor, the electronic device to receive, when the execution screen corresponds to the screen of the scene transition operation, a frequency event from the application.

4. The electronic device of claim 3, wherein the instructions cause, when executed by the processor, the electronic device to determine the refresh rate of the display based on the received frequency event and the predetermined settings, and wherein the frequency event includes information for operating the display at the second frequency.

5. The electronic device of claim 1, wherein the instructions cause, when executed by the processor, the electronic device to identify a layout for configuration of the execution screen of the application; and based on the execution screen that needs to operate at a separate refresh rate being present in the identified layout, determine whether the execution screen corresponds to the screen of the scene transition operation.

6. The electronic device of claim 1, wherein the predetermined settings are related to the refresh rate for the application and are set for the application based on a setting application.

7. The electronic device of claim 6, wherein the instructions cause, when executed by the processor, the electronic device to display a setting interface associated with the refresh rate of the display when the setting application is executed; and set the refresh rate of the display based on a user selection for the setting interface, wherein the setting interface includes a first item for operating the display at the refresh rate in the first frequency and a second item for operating the display at the refresh rate in the first frequency to the second frequency.

8. A method of operating a high speed screen of an electronic device, the method comprising:
controlling a display to display an execution screen of an application based on a predetermined settings;
determining whether the execution screen corresponds to a screen of a scene transition operation;
detecting that the execution screen corresponds to the screen of the scene transition operation and, controlling the display to operate at a refresh rate of the display in a first frequency to a second frequency higher than the first frequency;
after the refresh rate of the display is changed from the first frequency to the second frequency, controlling the display to display a first frame of a screen as a black frame at the refresh rate of the display in the second frequency to reduce flicker of the display; and
controlling the display to operate at a refresh rate less than or equal to the first frequency when an illuminance of an ambient environment of the electronic device is less than or equal to a predetermined illuminance.

9. The method of claim 8, further comprising:
when the execution screen corresponds to the screen of the scene transition operation, controlling the display to operate at the refresh rate of the display less than or equal to the second frequency.

10. The method of claim 8, further comprising:
receiving, when the execution screen corresponds to the screen of the scene transition operation, a frequency event from the application.

11. The method of claim 10, further comprising:
determining the refresh rate of the display based on the received frequency event and the predetermined settings, and
wherein the frequency event includes information for operating the display at the second frequency.

12. The method of claim 8, further comprising:
identifying a layout for configuration of the execution screen of the application; and
based on the execution screen that needs to operate at a separate refresh rate being present in the identified layout, determining whether the execution screen corresponds to the screen of the scene transition operation.

13. The method of claim 8, wherein the predetermined settings are related to the refresh rate for the application and are set for the application based on a setting application.

14. The method of claim 13, further comprising:
displaying a setting interface associated with the refresh rate of the display when the setting application is executed; and
setting the refresh rate of the display based on a user selection for the setting interface,
wherein the setting interface includes a first item for operating the display at the refresh rate in the first frequency and a second item for operating the display at the refresh rate in the first frequency to the second frequency.

* * * * *